(12) United States Patent
Michalski

(10) Patent No.: US 12,435,714 B2
(45) Date of Patent: Oct. 7, 2025

(54) PUMP COMPRISING COOLING MEANS

(71) Applicant: F2M, Naintre (FR)

(72) Inventor: Eric Michalski, Lesigny sur Creuse (FR)

(73) Assignee: F2M, Naintre (FR)

( * ) Notice: Subject to any disclaimer, the term of this patent is extended or adjusted under 35 U.S.C. 154(b) by 37 days.

(21) Appl. No.: 18/249,510

(22) PCT Filed: Oct. 8, 2021

(86) PCT No.: PCT/EP2021/077929
§ 371 (c)(1),
(2) Date: Apr. 18, 2023

(87) PCT Pub. No.: WO2022/084072
PCT Pub. Date: Apr. 28, 2022

(65) Prior Publication Data
US 2023/0383742 A1 Nov. 30, 2023

(30) Foreign Application Priority Data

Oct. 19, 2020 (FR) ...................................... 2010707
Oct. 19, 2020 (FR) ...................................... 2010708
(Continued)

(51) Int. Cl.
*F04B 49/12* (2006.01)
*F04B 15/08* (2006.01)
(Continued)

(52) U.S. Cl.
CPC .............. *F04B 49/12* (2013.01); *F04B 15/08* (2013.01); *F04B 19/22* (2013.01); *F04B 49/065* (2013.01); *F04B 53/143* (2013.01)

(58) Field of Classification Search
CPC .... F16J 1/005; F16J 1/006; F16J 1/007; F02F 3/0015; F02F 3/0069
(Continued)

(56) References Cited

U.S. PATENT DOCUMENTS

| 1,628,097 A | 5/1927 | Worth |
| 2,439,958 A | 4/1948 | Anderson |

(Continued)

FOREIGN PATENT DOCUMENTS

| CA | 2045322 A1 | 12/1991 |
| DE | 1926379 A1 | 11/1970 |

(Continued)

OTHER PUBLICATIONS

International Search Report dated Nov. 22, 2021 for corresponding International Application No. PCT/PCT/ EP2021/077929, filed Oct. 8, 2021.
(Continued)

*Primary Examiner* — Kenneth J Hansen
(74) *Attorney, Agent, or Firm* — David D. Brush; Westman, Champlin & Koehler, P.A.

(57) ABSTRACT

A pump for fluid to be pumped from a fluidic reserve. The pump includes a pump body having: a first end from which extends at least one intake manifold opening into a fluidic chamber to enable a fluid intake; a second end opposite the first end; and at least one fluidic pipe extending spirally about the pump body between the first end and the second end. The fluidic pipe has a first opening for connecting to the fluidic reserve, located at the second end of the pump body, and a second opening connected to the intake manifold.

8 Claims, 16 Drawing Sheets

(30) Foreign Application Priority Data

| Oct. 19, 2020 | (FR) | 2010709 |
|---|---|---|
| Oct. 19, 2020 | (FR) | 2010710 |
| Oct. 19, 2020 | (FR) | 2010711 |

(51) Int. Cl.

| F04B 19/22 | (2006.01) |
|---|---|
| F04B 49/06 | (2006.01) |
| F04B 53/14 | (2006.01) |

(58) Field of Classification Search
 USPC .................................................. 92/257, 258
 See application file for complete search history.

(56) References Cited

U.S. PATENT DOCUMENTS

| 3,101,651 | A | * | 8/1963 | Strader | F15B 15/1452 |
| | | | | | 92/252 |
| 4,156,584 | A | * | 5/1979 | Schuck | F04B 15/08 |
| | | | | | 417/570 |
| 4,396,354 | A | | 8/1983 | Thompson et al. | |
| 2003/0080512 | A1 | | 5/2003 | Colson | |
| 2003/0227139 | A1 | * | 12/2003 | Antoun | F16J 15/185 |
| | | | | | 277/467 |
| 2005/0086949 | A1 | | 4/2005 | Noble et al. | |
| 2013/0032745 | A1 | | 2/2013 | Stein et al. | |
| 2015/0211641 | A1 | | 7/2015 | Pacht | |
| 2016/0245266 | A1 | | 8/2016 | Huang | |
| 2018/0128225 | A1 | | 5/2018 | Kounosu et al. | |
| 2020/0232301 | A1 | | 7/2020 | Andersson | |

FOREIGN PATENT DOCUMENTS

| DE | 3520668 A1 | 6/1986 |
| EP | 2541062 A1 | 1/2013 |
| FR | 2805006 A1 | 8/2001 |
| FR | 2961560 A3 | 12/2011 |
| GB | 647455 A | 8/1942 |
| GB | 1077092 A | 7/1967 |
| WO | 2018091178 A1 | 5/2018 |

OTHER PUBLICATIONS

Written Opinion of the International Searching Authority dated Nov. 22, 2021 for corresponding International Application No. PCT/EP2021/077929, filed Oct. 8, 2021.

English translation of the Written Opinion of the International Searching Authority dated Nov. 22, 2021 for corresponding International Application No. PCT/EP2021/077929, filed Oct. 8, 2021.

* cited by examiner

PUMP COMPRISING COOLING MEANS

CROSS-REFERENCE TO RELATED APPLICATIONS

This Application is a Section 371 National Stage Application of International Application No. PCT/EP2021/077929, filed Oct. 8, 2021, which is incorporated by reference in its entirety and published as WO 2022/084072 A1 on Apr. 28, 2022, not in English.

FIELD OF THE DISCLOSURE

The field of the invention is that of the design and manufacture of fluid pumping devices.

More specifically, the invention relates to a cryogenic fluid pump.

BACKGROUND OF THE DISCLOSURE

Cryogenic fluids are fluids, generally gases, stored in the liquid state, which are pumped to be moved from one tank to another.

Conventionally, pumps comprise a pump body defining a fluidic chamber, the pump body having an inlet for sucking the fluid into the pump body, and an outlet for ejecting the fluid from the pump body.

The intake and ejection of the fluid are carried out via a movable piston inside the pump body.

More specifically, the piston comprises a head wherein the radial periphery is in contact with the interior of the fluidic chamber to alternately define an intake volume and an ejection volume of fluid inside the fluidic body.

To enable the intake or ejection of the fluid, at least one intake valve and one ejection valve are mounted on the pump body to enable, respectively, the entry of the fluid into the pump body and the exit thereof from the pump body.

The movements of the piston in the pump body can give rise to heating of the pump body and the piston.

Such heating can reduce the efficiency of the pump, or generate leaks or, in the worst case, pose a risk for the safety of persons moving about within a perimeter surrounding the pump.

Similarly, according to the fluid to be pumped, a substantial temperature gradient may be observed in the parts of the pump.

Such a temperature gradient can then harm the structural integrity of the parts of the pump, particularly by embrittling them.

Cryogenic fluids, through the intrinsic characteristics thereof, have an impact on the elements of a pump during the circulation thereof in the pump.

In particular, the parts of the pump, can cool substantially, or even retract.

However, the movements of the piston in the pump body, and any resulting heating, can generate an excessive thermal gradient in the pump body or the piston for example, which can result in them breaking.

In the case of a fluid that is flammable or the expansion whereof can induce the combustion thereof, there are therefore risks of fire or explosion of the pump, and therefore a hazard for persons in the vicinity of the pump.

Pumps have therefore been developed to help maintain the pump body at an optimal temperature, such as for example that described in the patent document published under the number GB 547 455. However, such a pump remains improvable in terms of efficiency.

SUMMARY

An exemplary embodiment of the present disclosure relates to a pump for fluid to be pumped from a fluidic reserve, the pump comprising a pump body defining a fluidic chamber, the pump body having:
- a first end from which extends at least one intake manifold opening into the fluidic chamber to enable a fluid intake into the fluidic chamber;
- a second end opposite the first end,
- the pump also comprising at least one fluidic pipe extending about the pump body between the first end and the second end,
- characterised in that the fluidic pipe has a first opening for connection to the fluidic reserve, located at the second end of the pump body, and
- a second opening connected to the intake manifold, to convey the fluid to be pumped from the reserve to the fluidic chamber via the fluidic pipe.

Such a pump is particularly adapted for pumping a cryogenic type fluid.

Indeed, the fluidic pipe makes it possible to cool the pump body which can tend to heat with the movement and friction of the piston in the pump body.

The circulation of the fluid in the fluidic pipe from the first opening to the second opening enables the fluid, which is then cooler since it is from the fluidic reserve, to cool the pump body by flowing along the pump body before entering the fluidic chamber via the intake manifold.

Advantageously, the pump also comprises a liner inside which the pump body is mounted, the fluidic pipe being embodied by a helicoidal groove formed on the outer wall of the pump body, the fluidic pipe then being delimited by the helicoidal groove of the pump body, on one hand, and by the liner, on the other.

Creating the fluidic pipe in the form of a helicoidal groove hollowed in the outer wall of the pump body enables a better thermal exchange between the pump body and the fluid circulating in the fluidic pipe.

Indeed, unlike a fluidic pipe mounted around the pump body, the fluid is in direct contact with the pump body, which helps maximise thermal exchanges.

The pump body is thus cooled better than by an outer fluidic pipe wound around the pump body.

Preferably, each helicoidal groove has at the centre thereof a central wall dividing the helicoidal groove into two independent sub-grooves, each sub-groove opening on either side of an intake manifold.

The use of sub-grooves makes it possible, besides better circulation of the fluid in the fluidic pipe, to supply each intake manifold in at least two different points. This thus offers better thermal distribution around the intake manifold.

According to an advantageous embodiment, the pump comprises three fluidic pipes each opening into an intake manifold.

The three fluidic pipes enable better cooling of the pump body, since a greater quantity of fluid can circulate in the grooves of the fluidic pipes.

Furthermore, the three fluidic pipes enable a better supply of fluid into each of the intake manifolds to enable a quantitative intake into the fluidic chamber of the pump body while minimising the filling time thereof.

Preferably, the three fluidic pipes are parallel relative to one another.

The parallelism of the fluidic pipes, relative to one another, makes it possible to obtain a homogeneous circulation of the fluid about the pump body, which ensures also homogeneous cooling of the pump body, which in other words prevents different temperature points in the pump body. These different temperature points, called hot spots, can for example generate brittleness in the pump body by thermal shocks.

Advantageously, the first openings of the fluidic pipes are regularly distributed on the periphery of the pump body.

The regular distribution on the pump body of the first openings of the fluidic pipes makes it possible to maximise the efficiency of the cooling by circulating fluid in the fluidic pipes.

Indeed, in the case of a pump body with a circular cross-section, each first end can be located 120° on the pump body from another first end, then enabling an inlet of the fluid distributed homogeneously at the periphery of the pump body.

In other words, for three inlets on the pump body, each inlet is located 120° from another adjacent inlet.

According to another advantageous aspect, the or each intake manifold is connected to the second opening of a fluidic pipe via a channel formed in the pump body.

Such a channel makes it possible to avoid using parts or manifolds external to the pump body, these external parts or manifolds potentially being brittle and requiring regular maintenance.

In other words, the channels can be formed for example by drilling or created directly during the manufacture of the pump body if the latter is created by 3D printing.

Furthermore, this makes it possible to avoid having a pump body made of several parts between each of which a seal must be inserted. The leak risks at the pump body are then limited or removed.

Preferably, the fluidic chamber has a frustoconical portion located at the first end of the pump body, the or each intake manifold opening into the frustoconical portion.

The frustoconical portion of the fluidic chamber makes it possible to maximise the volume of the fluidic chamber and therefore increase the efficiency of the pump.

Advantageously, the frustoconical portion ends with an end face whereon a discharge manifold opens.

The positioning of the discharge manifold intake thus makes it possible to facilitate the discharge, from the pump body, of the pumped fluid present in the fluidic chamber, simply and effectively. Indeed, the discharge manifold being positioned in the translation axis of the piston in the pump body, this facilitates the flow of the pumped fluid from the pump.

Moreover, cryogenic fluids, by the intrinsic characteristics thereof, have an impact on the elements of a pump during the circulation thereof in the pump.

In particular, the parts of the pump, and more specifically, the head of the piston can retract to the extent that the radial periphery thereof is no longer in contact with the interior of the fluidic chamber, which then creates leaks of fluid from the variable volume, inside the pump body.

In the case of a fluid that is flammable or the expansion whereof can induce the combustion thereof, there are risks of fire or explosion of the pump.

To remedy this, piston heads with stages have been developed.

These heads, as for example described in the patent document published under the number FR 2 718 193, comprise several disks assembled with each other by means of one or more screws, and which define therebetween annular housings wherein O-rings is disposed.

These piston heads however do not offer all the necessary guarantees for cryogenic fluid pumping safety.

Indeed, by the retraction thereof in contact with a cryogenic fluid, the screws no longer hold the disks in position which then provide spaces between which the I-rings are free to move and wherein the cryogenic fluid can circulate and leak.

An exemplary embodiment also relates to a pump piston, comprising:
  at least two disks stacked on one another, each disk having a top face and a bottom face opposite the top face;
  a continuous annular seal, housed between the two disks, characterised in that each disk has, at the centre thereof, a hole opening onto the bottom face and in that at least one of the disks has, at the centre thereof, a projection extending from the top face and cooperating with the hole of the other of the disks such that the continuous annular seal is clamped between the disks.

Such an arrangement of the disks, and particularly the cooperation between the holes and the projections, makes it possible to be able to obtain a piston and particularly a piston head of easy assembly which ensures a secure hold of the seal.

Indeed, the hole and the projection of each disk being centred on the bottom face and on the top face respectively, this makes it possible to render the disposition of the disks concentric, so as to enable good tightness between the piston and a pump body wherein the piston is mounted in translation.

In other words, this makes it possible for, from a translation axis of the piston, the radial extension of each disk to be identical at all points.

Preferably, the piston comprises at least a third disk having:
  a top face from which a projection extends;
  a bottom face whereon a hole opens,
  the third disk being assembled with the two other disks by cooperation of the projection thereof with a free hole of the two other disks,
  and in that it also comprises a second continuous annular seal inserted between the top face of the third disk and the bottom face of one of the two other disks with which it is assembled.

The third disk makes it possible to mount a second annular seal on the piston.

This then promotes the tightness between the piston and the pump body wherein the piston is mounted.

Furthermore, like the two other disks, the third disk can be mounted coaxially with the two other disks, which makes it possible to increase the quality of the tightness between the piston and the pump body wherein the piston is mounted.

Advantageously, the piston comprises a connection part to a piston rod, the connection part having, at the centre thereof a pin cooperating with a free hole of one of the disks.

The connection part, thanks to the projection thereof, can thus be mounted coaxially with the disks of the piston, which makes it possible to provide good axial guidance of the piston in the pump body wherein it is mounted.

This then contributes to the good tightness between the piston, on one hand, and the pump body wherein the piston is mounted, on the other.

In this case, the connection part preferably has a connection portion opposite the pin, the connection portion having a spherical shape intended to be received in a spherical cavity of the piston rod.

The spherical shape makes it possible, thanks to the cooperation thereof with the rod, to form a ball and socket joint thus ensuring that any offset of the rod and/or the head of the piston is taken into account and therefore guarantee the tightness between the piston and the pump body wherein the piston is mounted.

According to an advantageous aspect, the or each continuous annular seal, has a U-shaped longitudinal cross-section, the U opening along a direction parallel with an axis of revolution of the continuous annular seal.

The U-shaped cross-section enables the continuous annular seal to deform easily to mould the shape of the inner wall and thus ensure effective tightness between the piston and the pump body wherein the piston is mounted.

Preferably, at least one of the disks has, on the top face thereof, a shoulder wherein the continuous annular seal is received.

The shoulder makes it possible to create a housing wherein the continuous annular seal is received.

This contributes to the correct positioning of the seal between the two disks, which then facilitates the elastic deformation of the seal to ensure the tightness between the piston and the pump body wherein the piston is mounted in translation.

According to a preferred embodiment, each hole has an internal thread and each projection has an external thread, the external thread of a projection cooperating helicoidally with the internal thread of a hole.

The internal thread and the external thread make it possible, by helicoidal cooperation, to facilitate the assembly of the disks of the piston with each other.

Furthermore, by applying a suitable tightening torque, it is possible to compress the continuous annular seal between two disks without for all that limiting the deformation thereof, such that the continuous annular seal ensures the tightness with the pump body wherein it is mounted in translation.

Advantageously, one of the disks is a head disk intended to be in contact with the fluid to be pumped, the top face of the head disk having a frustoconical shape.

Thus, using invar to produce the disks of the piston, the piston will only be affected very slightly by the negative temperatures of the pumped cryogenic fluid, thus helping retain good tightness between the piston and the pump body wherein the piston is mounted in translation.

Preferably, each disk of made of invar.

Invar makes it possible to use the piston in a cryogenic fluid pump in particular.

Indeed, invar has mechanical characteristics enabling it to withstand these very low temperatures, without being deformed or embrittled, or almost.

Alternatively, any other material having structural and functional characteristics similar or identical to those of invar could be used.

According to another advantageous aspect, the or each continuous annular seal is made of a material of the polyimide family.

Like invar, materials of the polyimide family have a low sensitivity to temperatures.

Thus, even in the case of very low temperatures, polyimide seals undergo very little or no deformation under the effect of low temperatures, which enables them to retain the shape and elasticity thereof, thus ensuring the tightness sought with the pump body.

The invention also relates to a pump body and a piston as described above, the piston being slidably mounted in the pump body such that the or each continuous annular seal is in contact with an inner wall of the pump body.

Moreover, cryogenic fluids are fluids, generally gases, stored in the liquid state, which are pumped to be moved from one tank to another.

For this, pumps are used.

Conventionally, pumps comprise a pump body defining a fluidic chamber, the pump body having an inlet for sucking the fluid into the pump body, and an outlet for ejecting the fluid from the pump body.

The inlet and the outlet can be identical and used in an entry or exit direction by means of one or more valves.

The intake and ejection of the fluid are carried out via a movable piston inside the pump body.

More specifically, the piston comprises a head wherein the radial periphery is in contact with the interior of the fluidic chamber to alternately define an intake volume and an ejection volume of fluid inside the fluidic body.

Cryogenic fluids, through the intrinsic characteristics thereof, have an impact on the elements of a pump during the circulation thereof in the pump.

In particular, the parts of the pump, can retract and become embrittled. This embrittlement stems for example from excessive cooling which can induce the breakage thereof in the event of shock for example.

The retraction of the parts of the pump can cause gaps between the parts, which can result in cryogenic fluid leaks from the pump.

In the case of a fluid that is flammable or the expansion whereof can induce the combustion thereof, there are risks of fire or explosion of the pump in the event of leakage.

Moreover, the parts of the pump in contact with the cryogenic fluid can cool the surrounding parts.

This cooling can be linked with a contact between the parts on one hand. In this case, it is possible to insert, between the different parts, elements made of insulating material which then act as thermal bridge breakers.

On the other hand, this cooling can be linked with temperature radiation.

This is particularly the case of the body of the pump which can radiate outwards from the pump.

The pump body is generally housed in a casing which can also be cooled by radiation from the pump body. To prevent this, insulation means can be inserted between the pump body and the casing, these insulating elements making it possible to create a temperature gradient between the casing and the pump body so that the casing is not cooled excessively, which could harm the integrity thereof.

However, some parts of the pump have little or no protection from radiation and/or conductivity.

This is particularly the case of motor means which can be cooled by the radiation from the pump body.

Furthermore, in the case of a cryogenic fluid pump, the pump body must be kept at an operating temperature to prevent expansion of the fluid. Indeed, such expansion of the fluid could induce a risk of combustion of the cryogenic fluid and therefore a risk of pump explosion.

It is therefore also necessary to prevent heating of the pump body by the motor means.

To prevent cooling of the motor means, or prevent heating of the pump body, it can therefore be possible either to move them away from the pump body to prevent radiation, or replace the piston rod by a low thermal conductivity material.

These solutions have certain drawbacks.

Moving the motor means away from the pump body goes against overall compactness and may require an increase in the capacities of the motor means to ensure a sought power transmission which accounts for the distance with respect to the pump body.

Furthermore, the use of a low thermal conductivity material for the piston rod can cause weaknesses in terms of mechanical strength. It is therefore necessary to increase the dimensions of the piston rod, which can induce an increase in the size of the pump, an increase in the weight of the pump and/or an increase in the power to be supplied by the motor means.

An exemplary embodiment of the invention also relates to a pump comprising a pumping compartment incorporating:
  a pump body;
  a piston movable in translation inside the pump body along a translation axis, the piston comprising a head and a rod whereby the head is moved in translation,
  the pump also comprising:
    a motor compartment incorporating motor means positioned along the translation axis and coupled with the piston rod to move the piston in the pump body;
    an intermediate compartment presented in the form of a tubular spacer connecting the pumping compartment and the motor compartment,
  the pump also comprising thermal insulation means to thermally insulate the pump from an external medium, the thermal insulation means comprising a tubular element housed in the intermediate compartment and extending around the piston rod, along the translation axis, between the pumping compartment and the motor compartment, the tubular element defining with the spacer a space to limit the radial radiation of the piston rod outwards from the pump,
  characterised in that the thermal insulation means also comprise at least one disk of insulating material, positioned inside the tubular element and extending radially to the translation axis, from the piston rod to the tubular element.

The disks of insulating material make it possible to limit the temperature radiation radially to the translation axis of the piston.

More specifically, these disks form a thermal barrier along the translation axis, which makes it possible, using the tubular element, to limit heating of the pump body, in particular when the pump fluid is a cryogenic fluid.

Advantageously, the pump also comprises a tubular support part, integral with the motor compartment and surrounding the piston rod, the tubular support part having at the outer periphery thereof a series of annular grooves each receiving a disk of insulating material.

The tubular support part makes it possible, while being connected to the motor compartment, to receive and hold in the insulating position the disks of insulating material, for the benefit of the insulation of the pump, particularly against thermal radiation.

Preferably, the tubular element has, about the translation axis, a revolution profile comprising an alternation of hollows and peaks with respect to the translation axis.

Alternating hollows and peaks on the revolution profile of the tubular elements enables the latter to be deformed axially, i.e. along the translation axis, to be able to account for a retraction or an expansion of the different parts of the pump, and particular the motor compartment and the pumping compartment which, by the retraction or expansion thereof, more apart or closer respectively with respect to one another.

Thus, the tubular part follows the separation or approaching movement of the motor compartment with respect to the pumping compartment.

According to a preferred embodiment, the thermal insulation means comprise five disks of insulating material, spaced regularly apart along the translation axis.

Using five disks of insulating material makes it possible to substantially limit the radiation along the translation axis.

Using five disks of insulating material makes it possible to create temperature chambers and therefore a temperature gradient with the separation with respect to the pumping compartment of a cryogenic fluid pump.

According to an advantageous aspect, the or each disk of insulating material is positioned facing a hollow of the tubular element.

The position facing a hollow of the tubular element of each of the disks of insulating material limits the temperature radiation passageway, which contributes to the insulation of the pump and increases the efficiency of the pump by preventing cooling of the other parts of the other parts of the pump by thermal radiation and heating of the pump body, also by thermal radiation.

Advantageously, the thermal insulation means also comprise a first layer of insulation material, the first layer of insulating material surrounding the pump body along the translation axis.

The first layer of insulating material which surrounds the pump body along the translation axis makes it possible to actively contribute to preventing heating of the pump body when the pumped fluid is a cryogenic fluid.

Preferably, the thermal insulation means comprise a second layer of insulating material, the second layer of insulating material surrounding the first layer of insulating material along the translation axis.

The second layer of insulating material makes it possible to further increase the insulation of the pump, and particularly of the pump body, both against radiation from the other elements of the pump, and thus against heating of the pump body when the pump is intended to pump a cryogenic fluid.

According to an advantageous aspect, the second layer of insulating material is integral with a tubular support mounted about the pump body, the tubular support being spaced apart from the first layer of insulating material to define, between the first layer of insulating material and the tubular support, a peripheral space to the pump body.

Creating the space between the first layer of insulating material and the second layer of insulating material makes it possible to add an additional insulation element. Indeed, the air, or the vacuum in the present case, between two solid elements makes it possible to thermally insulate the element with respect to each other.

In the case of a pump intended for pumping a cryogenic fluid, this space makes it possible to create a temperature gradient between the first layer of insulating material and the second layer of insulating material, which has the effect of improving, on one hand, the performances and the efficiency of the pump and, on the other, of preventing structural fatigue of the elements of the pump, prematurely.

Preferably, the insulating material is an aluminised polyethylene terephthalate.

Aluminised polyethylene terephthalate makes it possible to provide a good level of thermal insulation while having a small thickness and a contained weight.

This material is particularly used for manufacturing survival blankets, or satellite insulation systems.

Advantageously, at least one of the tubular element, the intermediate compartment and the rod of the piston is made of a composite material.

Using a composite material, comprising for example fibreglass and epoxy resin, makes it possible to limit the thermal exchanges between the parts of the pump by conduction.

Moreover, cryogenic fluids are fluids, generally gases, stored in the liquid state, which are pumped to be moved from one tank to another.

For this, pumps are used.

Conventionally, pumps comprise a pump body defining a fluidic chamber, the pump body having an inlet for sucking the fluid into the pump body, and an outlet for ejecting the fluid from the pump body.

The intake and ejection of the fluid are carried out via a movable piston inside the pump body.

More specifically, the piston comprises a head wherein the radial periphery is in contact with the interior of the fluidic chamber to alternately define an intake volume and an ejection volume of fluid inside the fluidic body.

Cryogenic fluids, through the intrinsic characteristics thereof, have an impact on the elements of a pump during the circulation thereof in the pump.

In particular, the parts of the pump, and more specifically, the head of the piston can retract to the extent that the variable volume of the pump is changed.

The efficiency of the pump is then reduced and, in the worst case, the pump may no longer enable the exchange of fluid between the tanks.

To remedy that, it is known to modify the stroke of the piston in order to maintain a suitable compression ratio in the pump, which makes it possible to maintain a sought intake and ejection flow rate.

A known method for managing piston stroke is based on opening and closing a pump supply valve. Thus, according to the valve opening time to supply the pump with fluid, the stroke of the piston will be modulated to obtain a sought compression ratio in the pump.

However, this method is not adapted to pumping a cryogenic fluid.

Indeed, the need to modify the stroke of the piston stems from the retraction of the piston which, for a constant stroke, induces an undesired increase of the variable volume and, hence, a decrease in the compression ratio.

Thus, despite a change of stroke according to a pump supply time, the size of the variable volume is not controlled, which impedes the efficiency of the pump.

An exemplary embodiment of the invention also relates to a pump comprising:
- a pump body;
- a piston movable in translation inside the pump body, along a translation axis;
- motor means for actuating the piston in translation in the pump body;
- means for setting the stroke of the piston,
- characterised in that the means for setting the stroke of the piston comprise:
  - an end-of-piston-stroke sensor;
  - a computer connected to the end-of-stroke sensor and to the motor means,
  - the computer being configured to generate and transmit an operating set-point to the motor means, using an output signal of the end-of-stroke sensor, and to adjust the stroke of the piston in the pump body along a predefined nominal stroke.

According to the output signal of the end-of-stroke sensor, the stroke of the piston can be increased or reduced by action on the motor means.

In normal operation, continually increasing the distance travelled by the piston thanks to the motor means can be carried out so as to continuously detect a signal by the end-of-stroke sensor.

Thus, in the case of a cryogenic fluid pump, the retraction due to the cooling of the cryogenic fluid can induce a decrease in the stroke of the piston in the pump body, this stroke then being increased via the motor means so as to obtain an equal or virtually equal efficiency of the pump throughout the operation of the pump.

In the event of detection of a signal, the piston stroke can then be modified and shortened by the motor means, or otherwise increased, by incrementation so as to obtain or retain a sought pumping efficiency.

Preferably, the end-of-stroke sensor is positioned on the pump body, outside it, along the translation axis.

Positioning the end-of-stroke sensor on the pump body makes it possible to limit intrusion and particularly the disturbances of the fluid in the pump body, particularly to maximise the efficiency of the pump.

In this case, the end-of-stroke sensor is advantageously positioned in the translation axis of the piston in the pump body.

Positioning the end-of-stroke sensor in the translation axis of the piston in the pump body makes it possible to obtain a reliable and accurate measurement of the movement of the piston in the pump body and thus be able to finely set the stroke of the piston in the pump body.

According to an advantageous aspect, the end-of-stroke sensor is an accelerometer.

Using an accelerometer enables the reliable and precise detection of the position or the top dead centre of the piston in the pump body, i.e. the abutment of the piston in the pump body. Modulating the translation distance of the piston in the pump body can thus be improved, for the benefit of the efficiency of the pump.

Preferably, the piston comprises a rod having an external thread, and the joint between the motor means and the piston rod is of the ball or roller screw type.

Using a ball or roller screw type joint between the motor means and the piston rod makes it possible to set the stroke of the piston in the pump body finely and quickly.

Thus, precisely and quickly, it is possible to set and modulate the stroke of the piston in the pump body to obtain or maintain a sought pumping efficiency.

Moreover, pump bodies generally comprise a cylinder head wherein the piston is movable, and a cylinder head cover which covers the cylinder head and whereon the intake valve(s) and the ejection valve(s) are mounted. To seal the pump body, a cylinder head seal is then inserted between the cylinder head and the cylinder head cover.

Cryogenic fluids, though the intrinsic characteristics thereof, have an impact on the elements of a pump during the circulation thereof in the pump.

In particular, the parts of the pump can retract to the extent that the cylinder head and the cylinder head cover can move apart, leaving an excessive gap to be filled by the cylinder head seal. Fluid leaks from the pump body can then result.

In the case of a fluid that is flammable or the expansion whereof can induce the combustion thereof, there are therefore risks of fire or explosion of the pump.

An exemplary embodiment of the invention also relates to a pump comprising:

a pump body having at least one intake manifold between outside and inside the pump body, the intake manifold having, at one end opening into the pump body, a valve seal having a semi-elliptical profile of revolution about a central axis of the valve seat;

for each valve seat, a valve having a rod;

the valve being movable in translation, along a movement axis defined by the valve rod, between:
  a passage position wherein it is spaced apart from the valve seat;
  a sealing position wherein it seals the valve seat, characterised in that the pump body has, in each intake manifold, upstream from the valve seat along a direction of fluid flow from outside to inside the pump, at least one notch, and in that the pump also comprises, for each valve:
  a guide in translation of the valve, the guide being received at least partially in the or each notch;
  means for returning the valve to the sealing position thereof, the return means being inserted between the valve and the guide, and in that the guide is mounted in the or each notch with a functional gap allowing a passage of the movement axis from an offset position with respect to the central axis, in the passage position, to a position merged with the central axis, in the sealing position.

Mounting the guide with a functional gap in the or each notch of the intake manifold makes it possible to adapt the position of the valve with respect to the valve seat automatically and reliably.

Indeed, thanks to the functional gap, the valve, which is then pushed back to the sealing position thereof by the pressure of the fluid in the fluidic chamber of the pump body, comes against the salve seat in a free and non-stressed manner. This also particularly prevents the valve from being locked in movement due to excessive stress.

To perform correct sealing at the valve seat, the valve, by the pressure prevailing in the fluidic chamber, naturally finds the definitive sealing position thereof. This definitive sealing position corresponds to a position wherein the valve rod extends in the axis of the manifold, this position being capable of being different when the valve abuts against the valve seat.

The functional gap thus makes it possible to compensate and allow the free mobility of the valve to abut against the valve seat, so that the valve reaches the nominal sealing position thereof in a failsafe manner.

Advantageously, the valve comprises a head located at one end of the rod, the head having a portion with a semi-elliptical profile oriented towards the rod and complementary in shape with the valve seat.

The portion with a semi-elliptical profile of the piston enables shape cooperation with the valve seat, which ensures good tightness between the valve seat and the valve head in the sealing position of the valve.

Preferably, the valve head has an annular groove inside which an annular seal is housed, the annular seal being inserted between the valve head and the valve seat in the sealing position of the valve.

The annular seal, by coming into contact on the valve seat, in the sealing position of the valve, makes it possible to ensure good tightness between the valve seat and the valve.

Thus, the valve can be slightly offset with respect to the axis of the manifold, the seal then making it possible to compensate this slight offset and therefore ensure the tightness between the valve and the valve seat, particularly when the valve is not entirely in the sealing position thereof.

In this case, the annular groove is preferably formed on the portion with a semi-elliptical profile of the valve head.

The presence of the groove makes it possible to house the annular seal such that the latter remains in position on the valve head during the movement of the valve and thus enable tightness between the valve and the valve seat, even when the valve is not in the sealing position thereof.

Advantageously, the annular seal has a convex part bearing against the valve seat in the sealing position of the valve, the convex part is elastically deformed to mould the valve seat and create hermetic sealing of the valve seat.

The presence of the convex part on the annular seal makes it possible to compensate for any offset of the valve and therefore ensure the tightness between the valve and the valve seat in all or virtually all configurations, when the valve is in the sealing position thereof or near the sealing position thereof.

Advantageously, the guide comprises a central shaft from which each three arms radially extend, each arm being mounted in a notch.

Such an architecture of the guide makes it possible to position it in the manifold without the latter impeding the flow of the fluid towards the fluidic chamber of the pump body.

Furthermore, using three arms makes it possible to ensure an ideal orientation of the valve during the movement thereof between the sealing position thereof and the passage position thereof, or vice versa. Finally, this guide architecture helps guide the valve during the movement thereof.

Preferably, the return means comprise a compression spring mounted about the central shaft of the guide, the spring being inserted between the arms of the guide and a stop integral with the rod at an opposite end of the head.

Such return means can be replaced simply and quickly. Moreover, positioning the return means makes it possible to position the valve in a normally closed position, i.e. retain the valve in the sealing position thereof when no fluid is pumped or when the piston induces a compression of the fluid in the fluidic chamber. This therefore makes it possible to ensure tightness between the valve seat and the valve, and therefore prevent a leak of fluid from the pump body.

The fluid thus can only be discharged by the ejection manifold of the pump body.

According to an advantageous aspect, the stop is mounted removably on the rod.

Thus, it is possible to be able to quickly change the return means by simply removing the stop which is mounted removably on the rod. Furthermore, this makes it possible to quickly mount the rod or the valve on the guide, in an easy manner for a technician.

Preferably, the pump comprises a liner having a bottom wall, the pump body being mounted in the liner, the bottom wall of the liner plugging an opening of the intake manifold opening outside the pump body.

The presence of the liner receiving the pump body makes it possible to close the manifolds and thus only be able to mount the valve via outside the pump body.

In other words, the pump body can thus be one-piece, which does not prevent the mounting of the valves for the intake of fluid in the fluidic chamber, while helping limit fluid leaks from the pump body as the pump body can be embodied in a one-piece manner, i.e. in a single piece without the presence of a seal which would then form a fluid leak risk between the parts.

Advantageously, each intake manifold forms with the bottom wall of the liner and the associated valve a fluid reserve in the pump body.

The fluid reserve makes it possible to create a buffer zone wherein the fluid is collected prior to the entry thereof in the fluidic chamber of the pump body, which ensures continuous operation of the pump and particularly continuous supply of the fluidic chamber, particularly when the stroke of the piston in the pump body is variable.

BRIEF DESCRIPTION OF THE DRAWINGS

Further features and advantages of the invention will become apparent on reading the following description of a preferential embodiment of the invention, given by way of illustrative and non-limiting example, and the appended drawings wherein.

DETAILED DESCRIPTION OF ILLUSTRATIVE EMBODIMENTS

Figure 1:
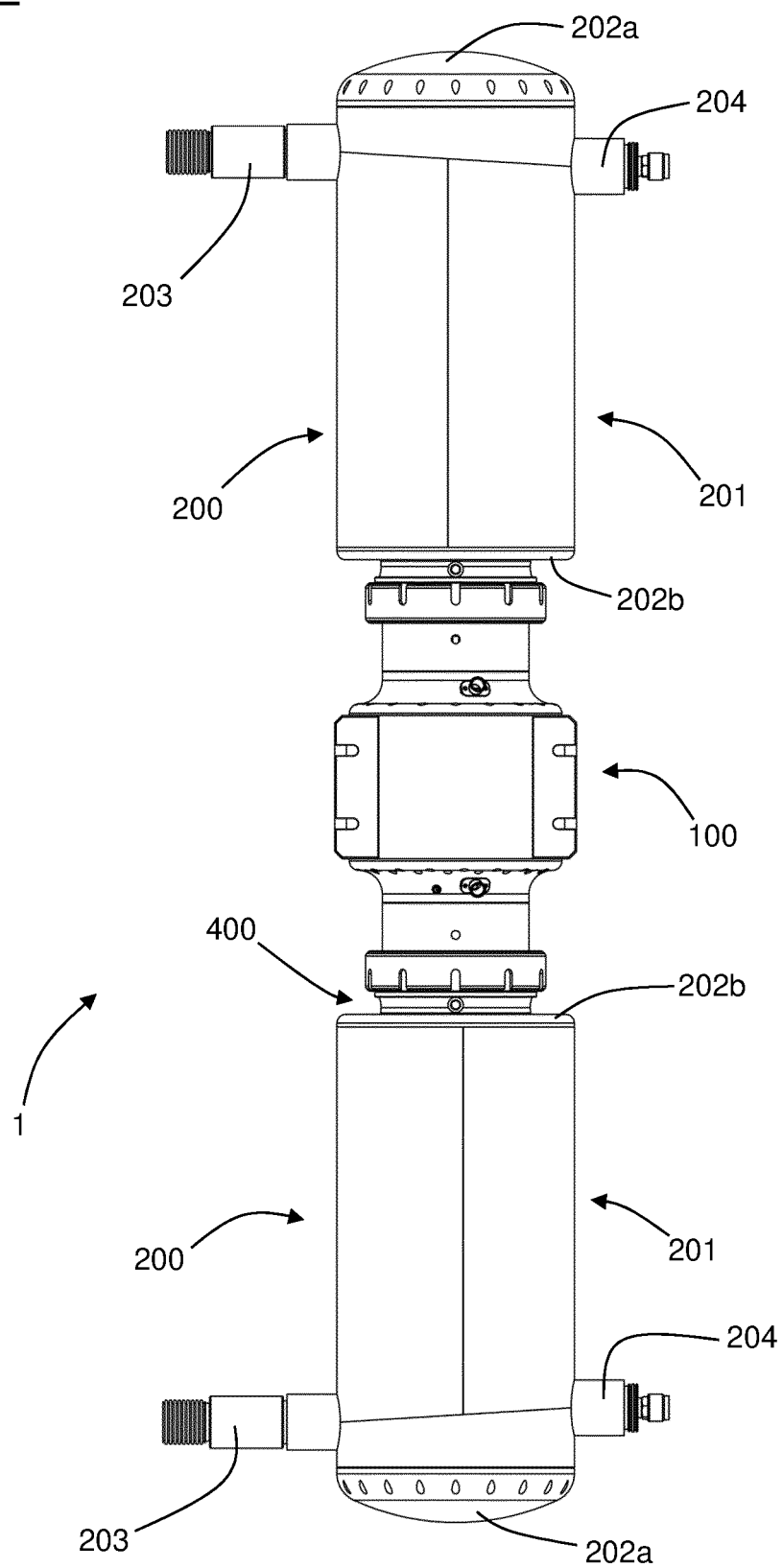
FIG. 1 is a top view of a pump according to the invention, the pump comprising a motor compartment and two pumping compartments distributed on either side of the motor compartment.

FIG. 1 illustrates a pump 1 comprising a motor compartment 100 and at least one pumping compartment 200.

More specifically, as illustrated in FIG. 1, the pump 1 advantageously comprises two pumping compartments 200.

The two pumping compartments 200 are each located on either side of the motor compartment 100.

Figure 2:
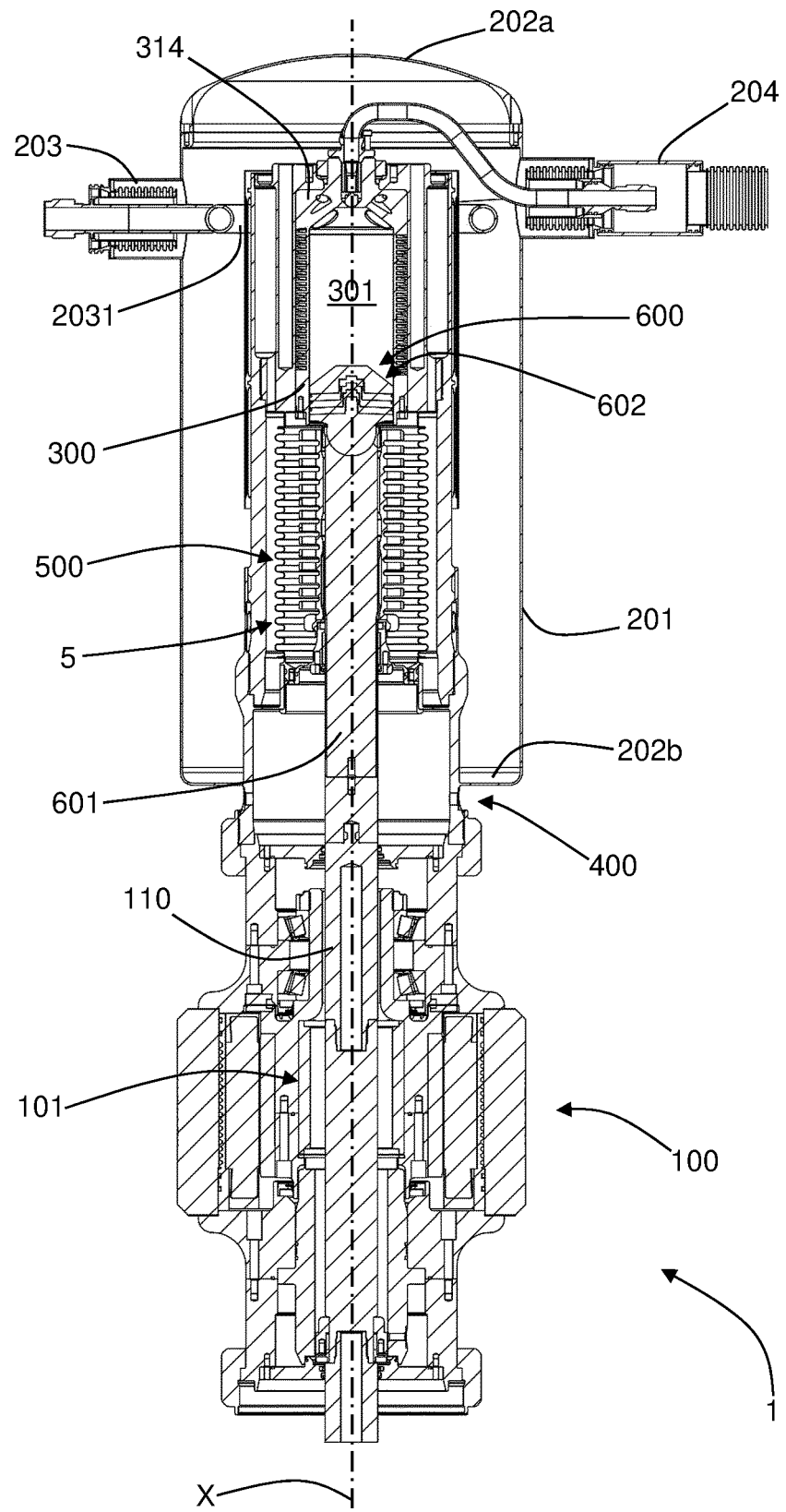
FIG. 2 is a simplified longitudinal sectional view of the pump according to the invention, wherein the motor compartment and only one of the pumping compartments is represented.

With reference to FIG. 2, the motor compartment 100 incorporates motor means 101 engaged with a transmission shaft 110 in turn connected to the pumping compartment 200.

Hereinafter in the description, reference is only made to a single pumping compartment 200, it being understood that the two pumping compartments 200 are identical and have the same structural and functional characteristics.

As illustrated in FIG. 2, the pumping compartment 200 comprises a pump body 300 inside which a piston 600 is movably mounted in translation along a translation axis X.

The translation axis X defines a longitudinal direction to the pump 1.

To enable pumping of a fluid, the pumping compartment 200 also comprises:

a supply coupling 203 opening into an intake manifold 2031 mounted about the pump body 300, and a discharge coupling 204.

More specifically, the intake manifold 2031 is presented in the form of an annular conduit surrounding the pump body 300, this annular conduit having a plurality of orifices for supplying the pump body 300 fluidically.

Furthermore, the pump 1 comprises an intermediate compartment 400 inserted between the motor compartment 100 and each pumping compartment 200 as well as insulation means 500.

In the aim of protecting the pumping compartment 200, the pump 1 comprises a casing 201 closed at one of the ends thereof by a cap 202a.

At the other of the ends thereof, the casing 201 extends in the direction of the motor compartment 100 and is closed by a cover 202b making it possible to define an internal volume of the casing 201 wherein the pump body 300 is housed and protected.

Preferably, a vacuum is created in the internal volume of the casing 201.

As seen in FIGS. 1 and 2, the supply coupling 203 and the discharge coupling 204 each open into the casing 201 to enable respectively the fluidic supply and extraction of fluid into and from the pump body 300.

The joint between the transmission shaft 110 and the piston 600 is embodied by ad hoc mechanical coupling means, these mechanical coupling means optionally being reversible, i.e. they make it possible to separate the transmission shaft 110 from the piston 600.

Advantageously, the motor means 101 comprise a ball screw or, more advantageously, a roller screw.

The ball screw or the roller screw makes it possible to convert a rotation movement of the motor means 101 into a translation movement of the transmission shaft 110 and therefore of the piston 600 in the pump body 300.

Advantageously, the motor means 101 comprise a direct current motor.

The pump body 300 defines a fluidic chamber 301 inside which the piston 600 is movable in translation along the translation axis X.

Through the mobility thereof in the fluidic chamber 301, the piston enables the pumping and ejection of fluid from a fluidic reserve to a tank to be filled.

More specifically, and conventionally, when the piston moves in a first direction along the translation axis X, so as to increase the volume in the fluidic chamber 301, a negative pressure is created inside the fluidic chamber 301 to enable the entry of fluid into the fluidic chamber 301 via the supply coupling 203 and more specifically via the intake manifold 2031.

Conversely, when the piston 600 moves in a second direction opposite the first direction, the volume of the fluidic chamber 301 is reduced as the piston 600 moves in the fluidic chamber 301, which induces the compression of the fluid contained in the fluidic chamber 301 and therefore the discharge thereof from the pump body 300 via the discharge coupling 204, towards the tank to be filled.

Figure 3:
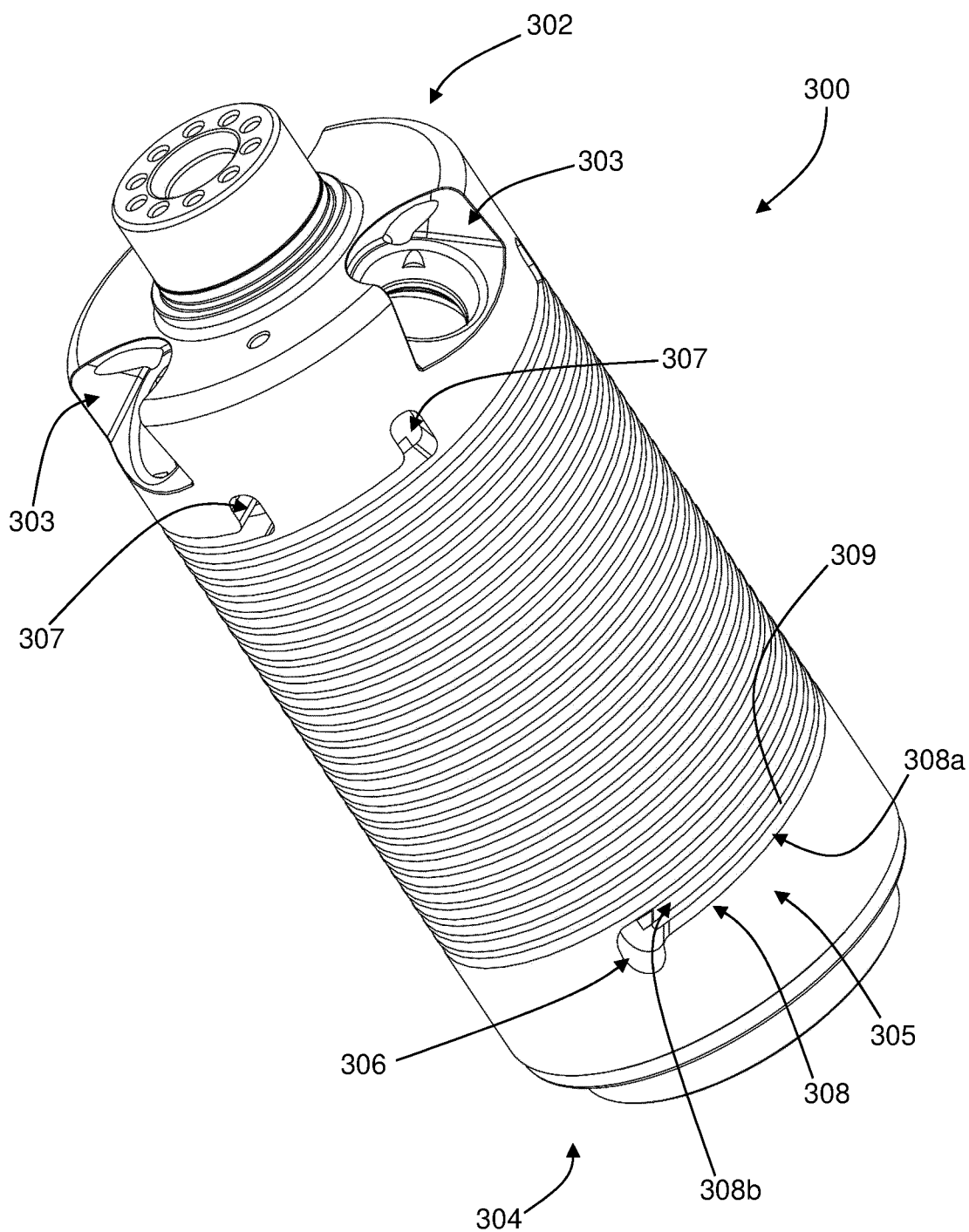
FIG. 3 is a perspective view of a pump body of the pump according to the invention.

With reference to FIG. 3, the pump body 300 is a revolving cylindrical hollow tube having a closed first end 302, and an open second end 304, opposite the first end.

As illustrated in FIG. 3, the first end 302 has at least one intake manifold 303 to enable the entry of the fluid to be pumped into the fluidic chamber 301.

Figure 5:
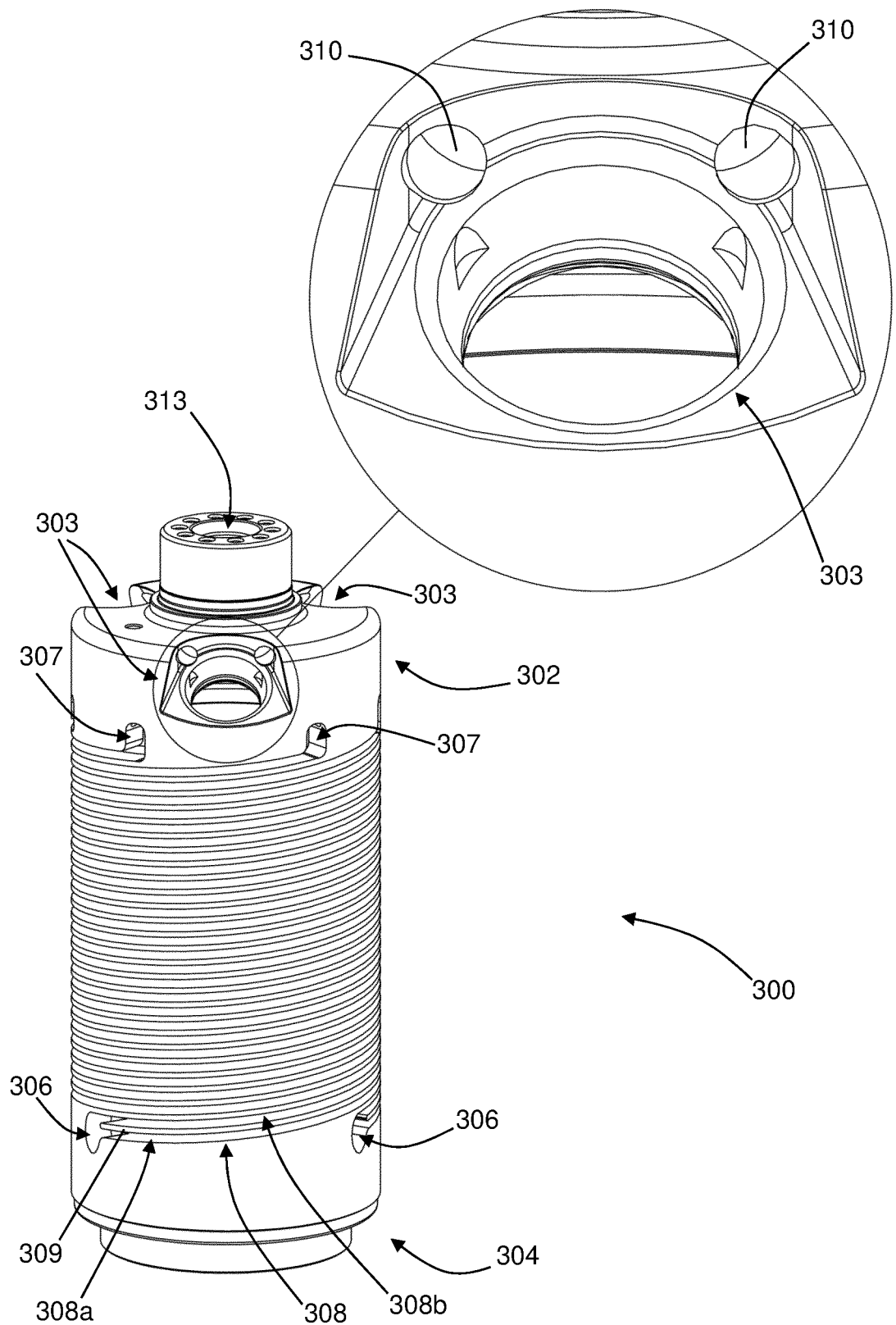
FIG. 5 is a perspective top view of the pump body of the pump according to the invention, this figure comprising a detailed inset on an enlarged scale, illustrating a fluidic intake manifold.
Figure 6:
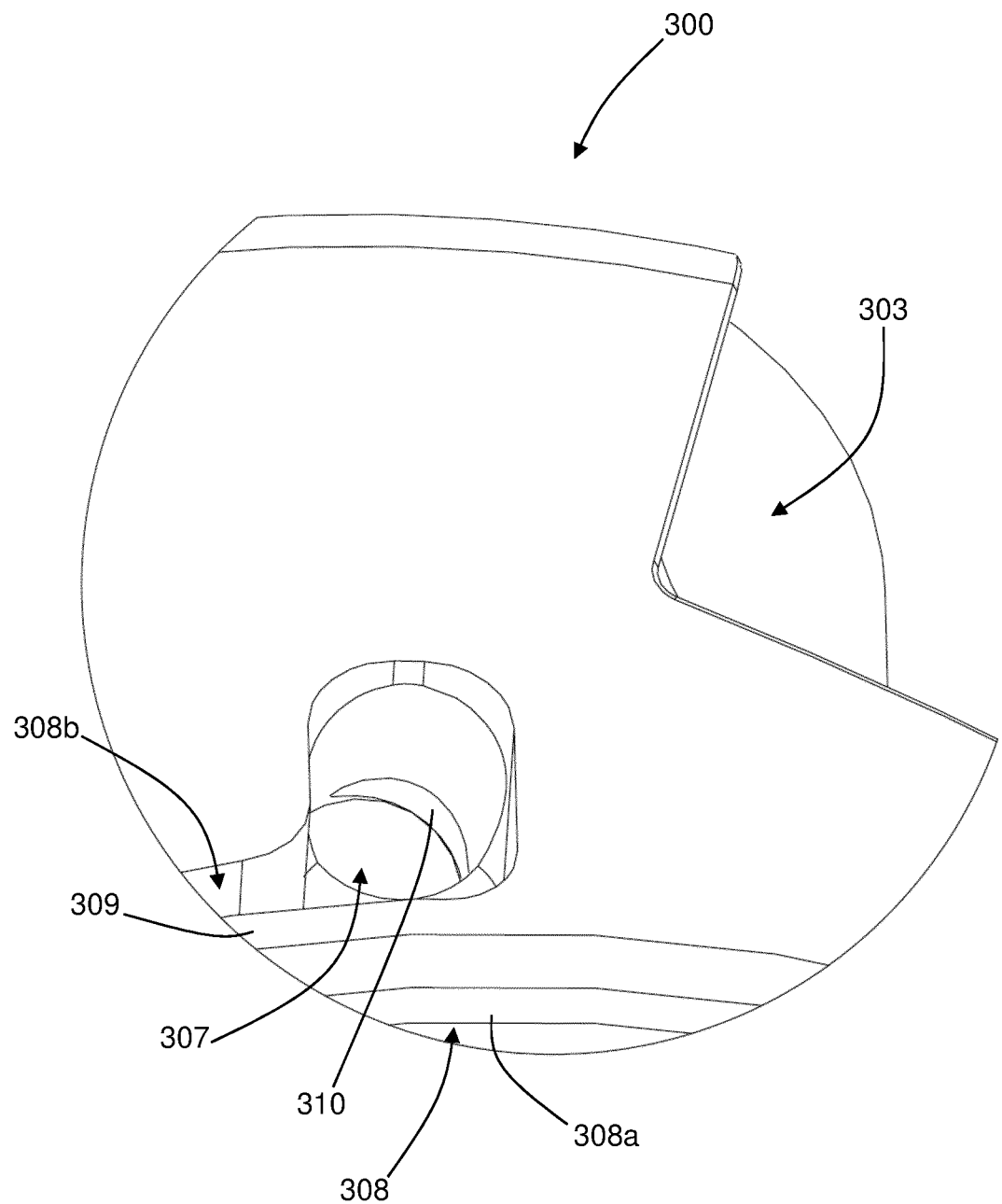
FIG. 6 is a detailed view of the pump body of the pump according to the invention, illustrating a fluidic intake channel in the fluidic intake manifolds.

More specifically, as seen in FIGS. 3 and 5 in particular, the first end has three intake manifolds 303.

Figure 7:
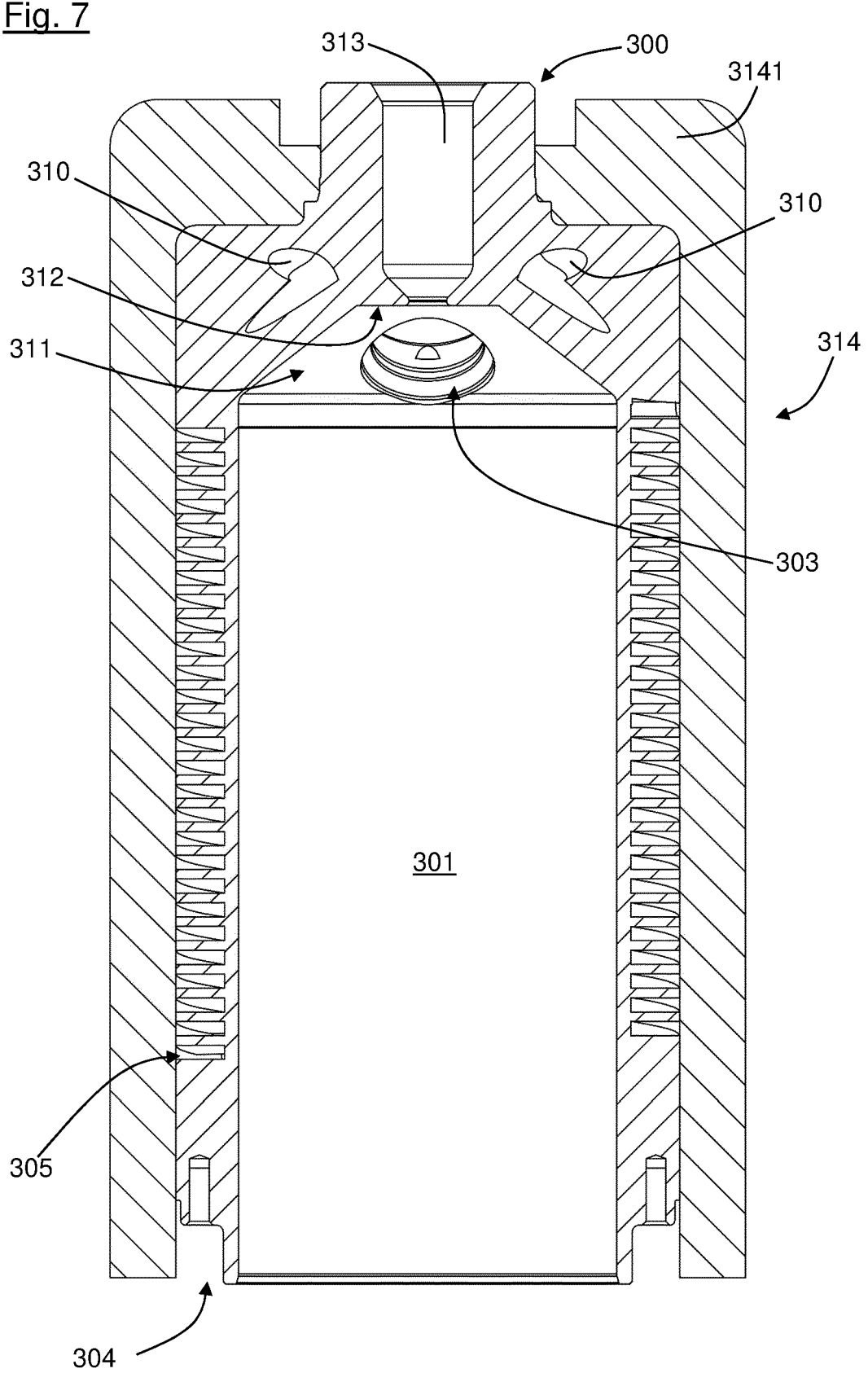
FIG. 7 is a schematic view illustrating the pump body of the pump according to the invention, surrounded by an external liner.

With reference to FIG. 7, the pump 1, and more specifically the pumping compartment 200, comprises a liner 314 surrounding the pump body 300.

More specifically, the pump body 300 is mounted in the liner 314, with no gap between the pump body 300 and the liner 314.

This liner 314 makes it possible to close the intake manifolds 303 so as to obtain tight intake manifolds 300 with respect to the outside of the pump body 300.

This pump body 300 is particularly adapted for pumping cryogenic fluids.

Cryogenic fluids, particularly in the liquid state thereof, have by way of specific characteristics a very low pressure and transfer temperature, for example less than −250° C.

Thus, during the circulation thereof in the elements of the pump 1, the cryogenic fluids can enable the cooling of the pump 1.

Compression has a major drawback for cryogenic fluids in that the latter, via the expansion thereof, can self-ignite and induce a risk of fire, or explosion, of the pump.

It is therefore necessary to limit the heating of the cryogenic fluid when it is pumped, in order to limit the expansion thereof and therefore limit the risks of fire or explosion of the pump 1.

For this, as seen in FIGS. 3, 4, 5 and 7, the pump body 300 comprises at least one fluidic pipe 305 which extends around the pump body 300, between the first end 302 and the second end 304.

More specifically, the fluidic pipe 305 extends spirally about the pump body 300.

The fluidic pipe 305 has a first opening 306 for connecting to the fluidic reserve and a second opening 307 connected to an intake manifold 303.

The first opening 306 is located at the second end 304 of the pump body 300 and the second opening 307 is connected to the intake manifold 303.

The fluidic pipe 305 makes it possible to convey the fluid to be pumped from the fluidic reserve to the fluidic chamber 301 of the pump body 300 via the fluidic pipe 305.

Figure 4:
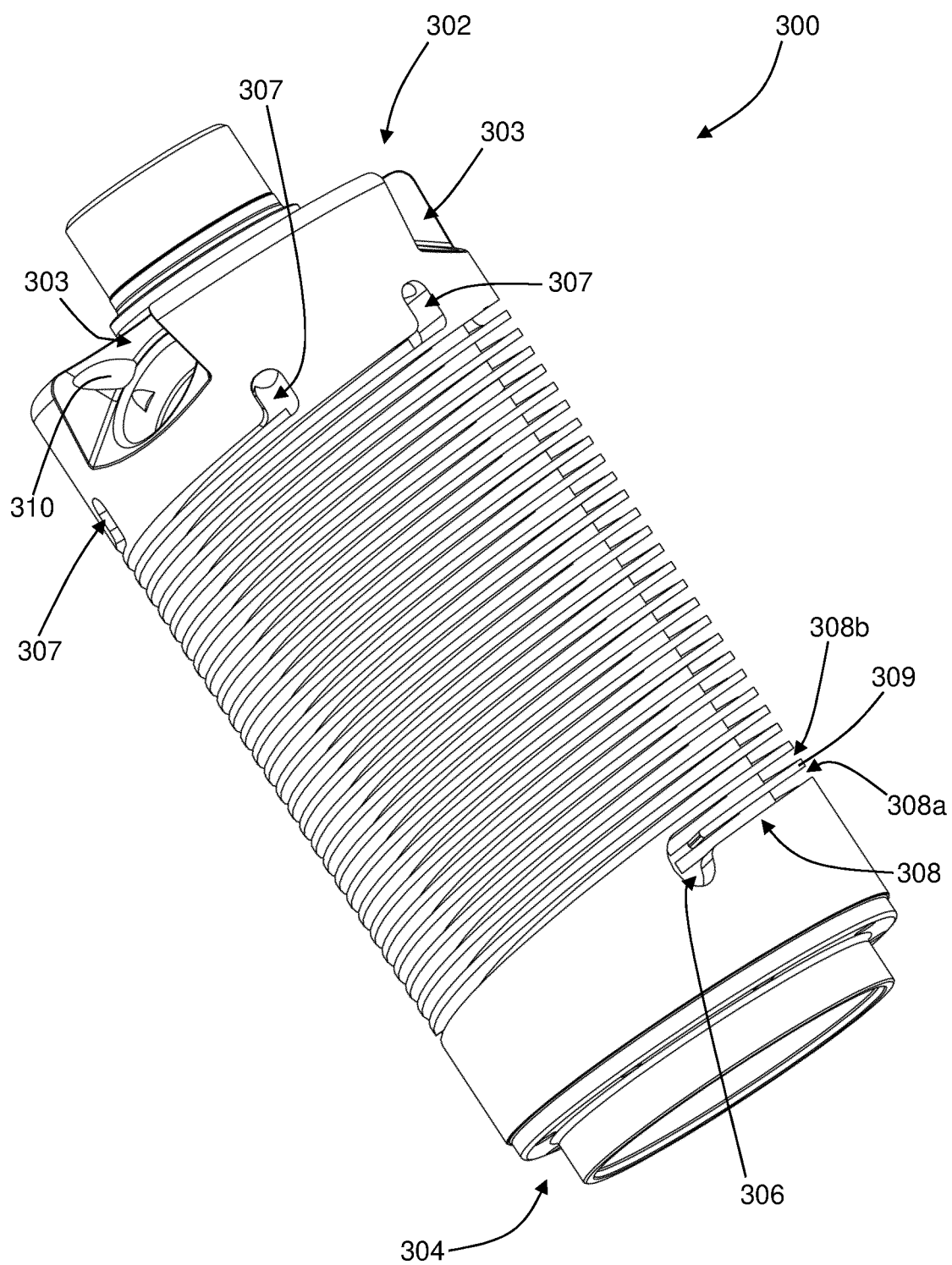
FIG. 4 is a perspective bottom view of the pump body of the pump according to the invention.

With reference to FIGS. 3, 4 and 7, the fluidic pipe 305 is embodied by a helicoidal groove formed on the outer wall of the pump body 300.

Again with reference to FIG. 7, the fluidic pump 305 is delimited by the pump body 300, and more specifically by the helicoidal groove 308, and the liner 314 which surrounds the pump body 300.

The fluid to be pumped therefore circulates from the first opening 306 in the helicoidal groove 308, by being trapped against the pump body 300 by the liner 314, up to the second opening 307 and therefore up to the intake manifold 303 to enter the fluidic chamber 301.

With reference to FIG. 5, the pump body 300 comprises several fluidic pipes 305.

In this instance, the pump body 300 has three fluidic pipes 305 regularly distributed on the periphery of the pump body 300. In a variant not illustrated in the figures, the pump body 300 can have more than three fluidic pipes 305, or on the other hand only two.

Each fluidic pipe 305 opens into one of the intake manifolds 303.

In other words, for each intake manifold 303, a fluidic pipe 305 is embodied via a helicoidal groove 308 to enable a fluidic supply of said intake manifold 303.

Advantageously, the three fluidic pipes 305 are parallel with one another.

As illustrated in FIGS. 3 and 4, each helicoidal groove 308 is divided into two sub-grooves 308a, 308b.

Each sub-groove 308a, 308b opens on either side of one of the intake manifolds 303.

In other words, a fluidic pipe 305 supplies an intake manifold 303 at two points.

A first sub-groove 308a opens onto a first side of the intake manifold 303 and a second sub-groove 308b opens onto the other side of the same manifold 303.

Thus, the fluid arrives homogeneously into the intake manifold 303, which enables quick filling of the intake manifold 303 but also controlled circulation of the fluid in the pump body to the intake manifolds 303.

The separation of the first sub-groove 308a with respect to the second sub-groove 308b is carried out by means of a central wall 309 which extends from the bottom of the helicoidal groove 308, i.e. from the pump body 300 to the liner 314.

Each sub-groove 308a, 308b opens into the first opening 306 and forms a second opening 307 separate from the other openings 307.

In other words, the pump body 300 has three fluidic pipes 305 each having one first opening 306 and two second openings 307.

In other words, the pump body 300 of the pump 1 according to the invention, which comprises three fluidic pipes 305, has three first openings 306 and six second openings 307.

Each fluidic pipe 305 is connected to an intake manifold 303 via a channel 310 at least, formed in the pump body 300.

More specifically, the channel 310 thus makes it possible to connect each intake manifold 303 to a second opening 307.

Advantageously, each channel 310 is embodied by at least one hole, and preferably two holes sequent with one another.

A first hole being produced from the first opening 307 and a second hole is produced from the intake manifold 303 towards the first hole.

The pump body 300 is open at the second end 304 to enable the insertion of the piston 600.

The fluidic chamber 301 has, at the first end 302 of the pump body 300, a frustoconical portion 311 wherein each of the intake manifolds 303 opens.

This frustoconical portion 311 has an end face 312 transversal to the translation axis X of the piston 600 in the pump body 300.

The pump body 300 also has a discharge manifold 313 opening onto the end face 312 of the frustoconical portion 311.

Unlike the intake manifolds 303 which are three in number in the pump body 300, the pump body 300 only comprises a single discharge manifold 313 located in the translation axis X of the piston 600.

The frustoconical portion 311 particularly makes it possible to limit the dead volume of the pump body 300, and also limit, or suppress, head losses in the pump 1.

The pump body 300 makes it possible, by the circulation of the fluid to be pumped, which is a cryogenic fluid, to be cooled during the operation of the pump 1.

Indeed, the movements of the piston 600 in the pump body 300 can induce heating of the pump body 300 and the piston 600 by friction, this heating then being limited, or suppressed, by circulation of the cryogenic fluid, at a negative temperature, about the pump body 300.

Thus, the risks of expansion of the fluid to be pump are limited, or suppressed, for the benefit of the safety of use of the pump 1.

FIG. 1 illustrates a pump 1 comprising a motor compartment 100 and at least one pumping compartment 200.

More specifically, as illustrated in FIG. 1, the pump 1 advantageously comprises two pumping compartments 200.

The two pumping compartments 200 are each located on either side of the motor compartment 100.

With reference to FIG. 2, the motor compartment 100 incorporates motor means 101 engaged with a transmission shaft 110 in turn connected to the pumping compartment 200.

Hereinafter in the description, reference is only made to a single pumping compartment 200, it being understood that the two pumping compartments 200 are identical and have the same structural and functional characteristics.

As illustrated in FIG. 2, the pumping compartment 200 comprises a pump body 300 inside which a piston 600 is movably mounted in translation along a translation axis X The translation axis X defines a longitudinal direction to the pump 1.

To enable pumping of a fluid, the pumping compartment 200 also comprises:
- a supply coupling 203 opening into an intake manifold 2031 mounted about the pump body 300, and
- a discharge coupling (204).

More specifically, the intake manifold 2031 is presented in the form of an annular conduit surrounding the pump body 300, this annular conduit having a plurality of orifices for supplying the pump body 300 fluidically.

Furthermore, the pump 1 comprises an intermediate compartment 400 inserted between the motor compartment 100 and each pumping compartment 200 as well as insulation means 500.

In the aim of protecting the pumping compartment 200, the pump 1 comprises a casing 201 closed at one of the ends thereof by a cap 202a.

At the other of the ends thereof, the casing 201 extends in the direction of the motor compartment 100 and is closed by a cover 202b making it possible to define an internal volume of the casing 201 wherein the pump body 300 is housed and protected.

Preferably, a vacuum is created in the internal volume of the casing 201.

As seen in FIGS. 1 and 2, the supply coupling 203 and the discharge coupling 204 each open into the casing 201 to enable respectively the fluidic supply and extraction of fluid into and from the pump body 300.

The joint between the transmission shaft 110 and the piston 600 is embodied by ad hoc mechanical coupling means, these mechanical coupling means optionally being reversible, i.e. they make it possible to separate the transmission shaft 110 from the piston 600.

Advantageously, the motor means 101 comprise a ball screw or, more advantageously, a roller screw.

The ball screw or the roller screw makes it possible to convert a rotation movement of the motor means 101 into a translation movement of the transmission shaft 110 and therefore of the piston 600 in the pump body 300.

Advantageously, the motor means 101 comprise a direct current motor.

The pump body 300 defines a fluidic chamber 301 inside which the piston 600 is movable in translation along the translation axis X.

Through the mobility thereof in the fluidic chamber 301, the piston 600 enables the pumping and ejection of fluid from a fluidic reserve to a tank to be filled.

More specifically, and conventionally, when the piston moves in a first direction along the translation axis X, so as to increase the volume in the fluidic chamber 301, a negative pressure is created inside the fluidic chamber 301 to enable the entry of fluid into the fluidic chamber 301 via the supply coupling 203 and more specifically via the intake manifold 2031.

Conversely, when the piston 600 moves in a second direction opposite the first direction, the volume of the fluidic chamber 301 is reduced as the piston 600 moves in the fluidic chamber 301, which induces the compression of the fluid contained in the fluidic chamber 301 and therefore the discharge thereof from the pump body 300 via the discharge coupling 204, towards the tank to be filled.

The pump body 300 is open at the second end 304 to enable the insertion of the piston 600.

The fluidic chamber 301 has, at the first end 302 of the pump body 300, a frustoconical portion 311 wherein each of the intake manifolds 303 opens.

This frustoconical portion 311 has an end face 312 transversal to the translation axis X of the piston 600 in the pump body 300.

The pump body 300 also has a discharge manifold 313 opening onto the end face 312 of the frustoconical portion 311.

Unlike the intake manifolds 303 which are three in number in the pump body 300, the pump body 300 only comprises a single discharge manifold 313 located in the translation axis X of the piston 600.

The frustoconical portion 311 particularly makes it possible to limit the dead volume of the pump body 300, and also limit, or suppress, head losses in the pump 1.

Figure 8:
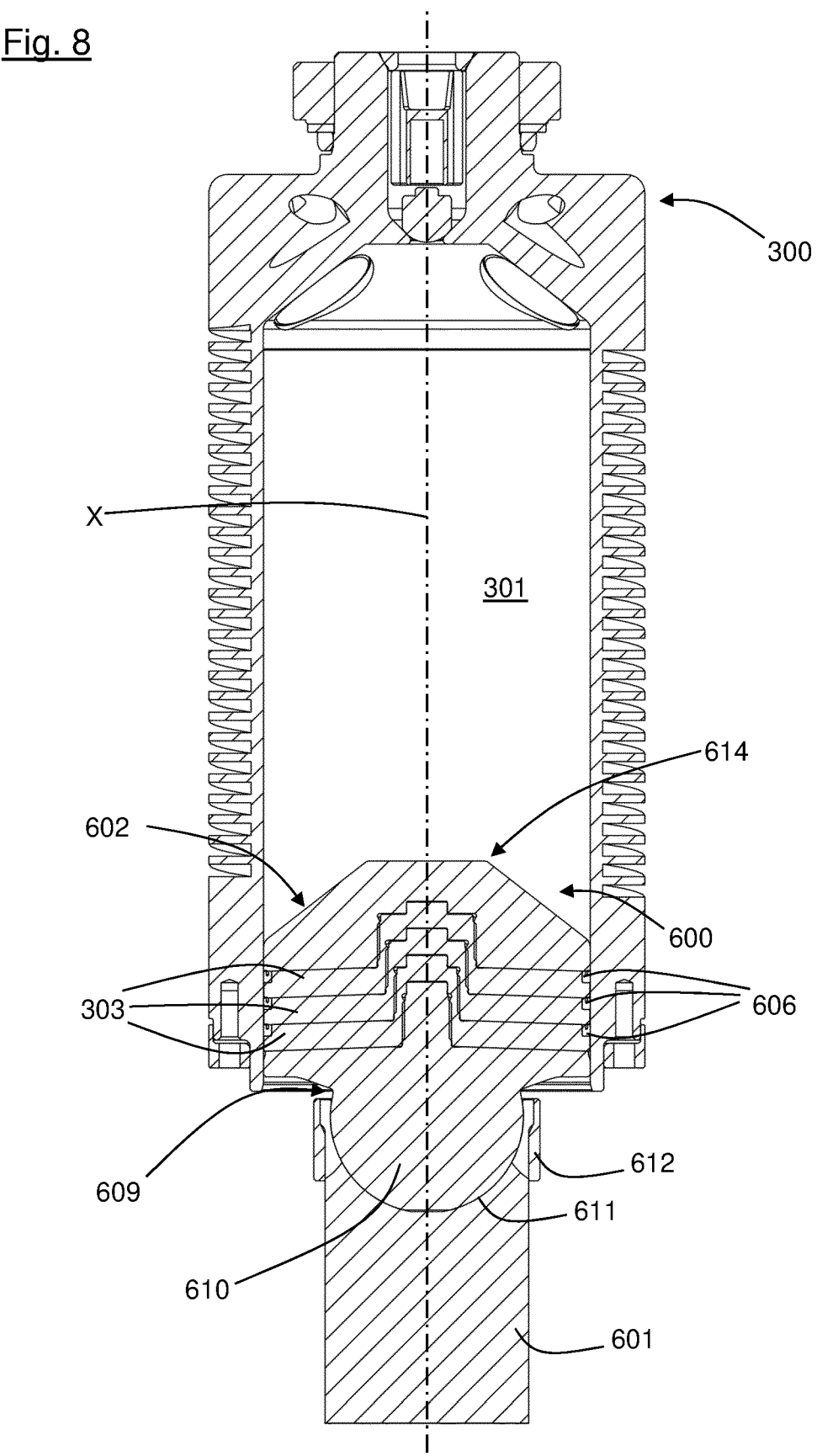
FIG. 8 is a longitudinal sectional view illustrating a piston in a pump body of the pump according to the invention.

With reference to FIG. 8, the piston 600 comprises a rod 601 and a head 602 connected to the rod 601.

During the movement in translation thereof, the piston 600 rubs against the walls of the pump body 300, which can induce heating of the pump body 300 and/or the piston 600.

To avoid these conventionally known problems, the piston 600 of the pump 1 according to the invention comprises:
- at least two disks 603 stacked on one another;
- a continuous annular seal 606 housed between the two disks 603.

Each disk 603 has a top face 604 and a bottom face 605 opposite one another.

The top faces 604 and the bottom faces 605 are advantageously transversal to the translation axis X of the piston 600 in the pump body 300.

Each disk 603 has, at the centre thereof, a hole 6031 opening onto the bottom face 605.

At least one of the disks 603 has a projection 6032 extending from the top face 604.

The projection 6032 is intended to cooperate with the hole 6031 of another disk 603 to enable the assembly of the two disks 603 together.

The continuous annular seal 606 is then inserted between the two disks 603 when the latter are assembled.

Figure 9:
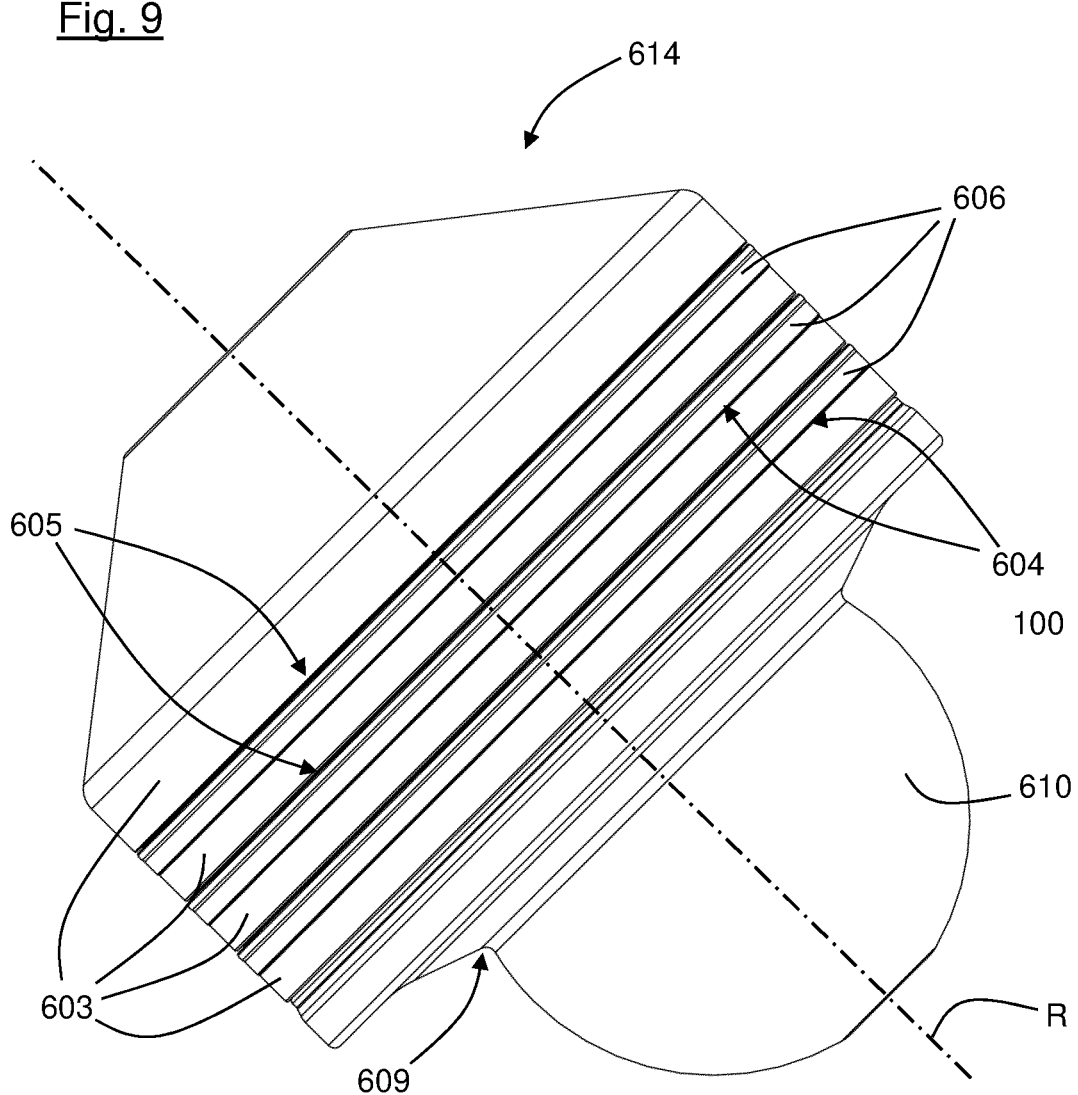
FIG. 9 is a side view of a piston head of the pump according to the invention.
Figure 10:
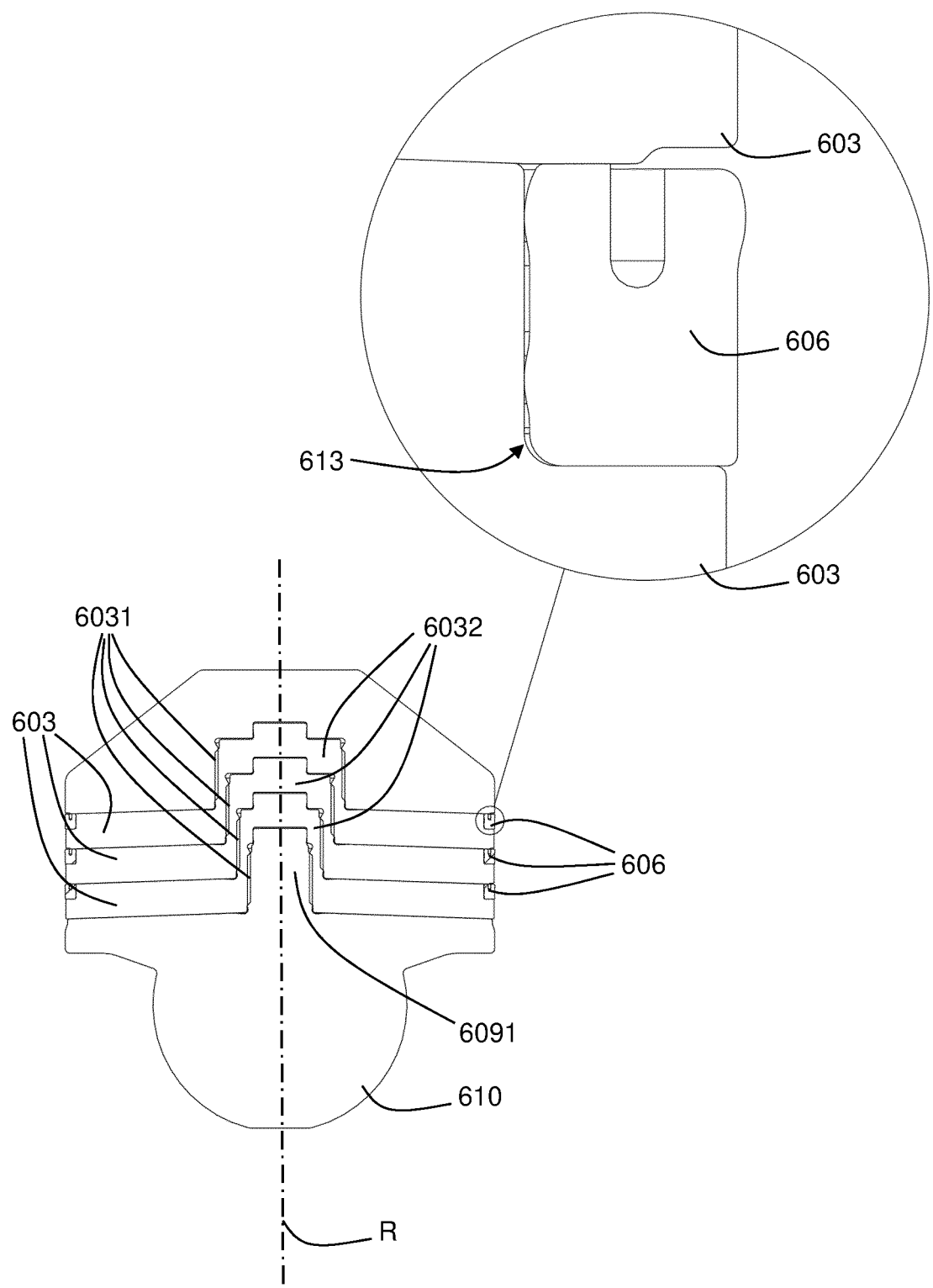
FIG. 10 is a longitudinal sectional view of a piston head of the pump according to the invention, this figure comprising a detailed inset on an enlarged scale illustrating an annular seal.

With reference to FIGS. 8, 9 and 10, the piston 600 also comprises at least one third disk 603.

The third disk 603 also has, like the first two disks 603, a top face 604 and a bottom face 605 opposite one another.

On this third disk 603, a projection 6032 extends from the top face 604 and a hole 6031 is formed, in the third disk 603, from the bottom face 605.

The piston 600 also comprises a second continuous annular seal 606 inserted between the assembly of the two first disks 603 and the third disk 603.

In other words, a continuous annular seal 606 is inserted between two assembled disks 603.

More specifically, two disks 603 are assembled together by cooperation of the projection 6032 of one of the disks 603 with the hole 6031 of the other of the disks 603.

Preferably, each hole 6031 has an internal thread and each projection 6032 has an external thread.

Thus, for the assembly of two disks 603 together, the external thread of the projection 6032 cooperates helicoidally with the internal thread of the hole 6031.

Alternatively, the cooperation between the projection 6032 and the hole 6031 could be embodied by force-fitting and therefore shape cooperation.

Furthermore, according to another variant, an adhesive could be used to hold the projection 6032 in a hole 6031.

With reference to FIG. 8, the first disk 603 is a head disk intended to be in contact with the fluid to be pumped.

The top face 604 of the head disk 603 preferably has a frustoconical shape 614. This frustoconical shape 614 is marked by the frustoconical portion 311 of the fluidic chamber 301 of the pump body 300.

The frustoconical shape 614 of the disk 603 makes it possible to maximise the efficiency of the pump 1.

Indeed, the shape cooperation between the frustoconical portion 311 of the pump body 300 and the frustoconical shape 614 of the head disk 603 makes it possible to limit the dead volume in the pump body, i.e. a volume wherein the compressed fluid undergoes little or no compression.

Moreover, this makes it possible to prevent excessive compression of the pumped fluid, particularly if the latter poses a heating or combustion risk.

Preferably, at least one of the disks 603 has on the top face 604 thereof a shoulder 613.

More specifically, except for the head disk 603, each disk 603 has a shoulder 613.

With reference to the detailed inset in FIG. 10, the continuous annular seals 606 are received in the shoulders 613 of each disk 603.

This particularly makes it possible to position the continuous annular seal 606 precisely between two assembled disks 603.

As illustrated in FIGS. 8, 9 and 10, the piston 600 also comprises a connection part 609 for connecting the piston head 602 to the rod 601.

The connection part 609 has at the centre thereof, a projection 6091 intended to cooperate with the hole 6031 of one of the disks 603.

More specifically, the pin 6091 has an external thread intended to cooperate with the internal thread of the hole 6031 of a disk 603.

Opposite the pin 6091, the connection part 609 has a connection portion 610.

As illustrated in FIGS. 8, 9 and 10, the connection portion 610 has a spherical shape intended to be received in a spherical cavity 611 of the rod 601.

Advantageously, the rod 601 has, at the spherical cavity 611, at least one cutting line enabling the rod 601 to be deformed to receive the connection portion 610 of the connection part 609.

The piston 600 also comprises a clamping ring 612 cooperating with the rod 601 at the spherical cavity 611, outside the latter.

The cooperation of the clamping ring 612 with the rod 601 makes it possible to hold in the spherical cavity 611 the connection portion 610 of the connection part 609.

With reference to the detailed inset of FIG. 10, each continuous annular seal 606 has a U-shaped longitudinal cross-section.

The U opens along a direction parallel with an axis of revolution R of the continuous annular seal 606.

The axis of revolution R is intended to be merged with the translation axis X of the piston 600 when the piston 600 is mounted in the pump body 300.

The U shape enables the continuous annular seal 606 to be deformed by the temperature and/or the compression between two disks. The deformation of the continuous annular seal 606 can thus be monitored and controlled.

Indeed, when two disks 603 are assembled with one another, the continuous annular seal 606, which is then received in the shoulder 613, is compressed between the top face 604 of a disk 603 and the bottom face 605 of another disk 603.

Through the cold temperatures of the fluid to be pumped, the continuous annular seal 606 can retract without any risk of breaking or being damaged.

Advantageously, each disk 603 is made of invar.

This material makes it possible to withstand the very low temperatures of the fluids such as cryogenic fluids.

Similar, each continuous annular seal 606 is made of a material of the polyimide family. Polyimides make it possible to withstand an extended range of temperatures with no or virtually no modification of the characteristics thereof.

When the piston 600 is mounted in the pump body 300, the or each continuous annular seal 606 is in contact with an internal wall of the pump body 300.

When the piston is assembled, as illustrated in Figure the holes 6031 and the projections 6032 of the disks 603 are coaxial with one another.

This helps ensure good tightness between the different disks 603 and between the disks 603 and the continuous annular seals 606.

Advantageously, the coaxiality of the projections 6032 and the holes 6031 is embodied along the axis of revolution R of the continuous annular seals 606.

FIG. 1 illustrates a pump 1 comprising a motor compartment 100 and at least one pumping compartment 200.

More specifically, as illustrated in FIG. 1, the pump 1 advantageously comprises two pumping compartments 200 each located on either side of the motor compartment 100.

With reference to FIG. 2, the motor compartment 100 incorporates motor means 101 engaged with a transmission shaft 110 in turn connected to the pumping compartment 200.

Hereinafter in the description, reference is only made to a single pumping compartment 200, it being understood that the two pumping compartments 200 are identical and have the same structural and functional characteristics.

As illustrated in FIG. 2, the pumping compartment 200 comprises a pump body 300 inside which a piston 600 is movably mounted in translation along a translation axis X.

The translation axis X defines a longitudinal direction to the pump 1.

To enable pumping of a fluid, the pumping compartment 200 also comprises:
- a supply coupling 203 opening into an intake manifold 2031 mounted about the pump body 300, and
- a discharge coupling 204.

More specifically, the intake manifold 2031 is presented in the form of an annular conduit surrounding the pump body 300, this annular conduit having a plurality of orifices for supplying the pump body 300 fluidically.

Furthermore, the pump 1 comprises an intermediate compartment 400 inserted between the motor compartment 100 and each pumping compartment 200 as well as insulation means 500.

In the aim of protecting the pumping compartment 200, the pump 1 comprises a casing 201 closed at one of the ends thereof by a cap 202a.

At the other of the ends thereof, the casing 201 extends in the direction of the motor compartment 100 and is closed by a cover 202b making it possible to define an internal volume of the casing 201 wherein the pump body 300 is housed and protected.

Preferably, a vacuum is created in the internal volume of the casing 201.

As seen in FIGS. 1 and 2, the supply coupling 203 and the discharge coupling 204 each open into the casing 201 to enable respectively the fluidic supply and extraction of fluid into and from the pump body 300.

The joint between the transmission shaft 110 and the piston 600 is embodied by ad hoc mechanical coupling means, these mechanical coupling means optionally being reversible, i.e. they make it possible to separate the transmission shaft 110 from the piston 600.

Advantageously, the motor means 101 comprise a ball screw or, more advantageously, a roller screw.

The ball screw or the roller screw makes it possible to convert a rotation movement of the motor means 101 into a translation movement of the transmission shaft 110 and therefore of the piston 600 in the pump body 300.

Advantageously, the motor means 101 comprise a direct current motor.

The pump body 300 defines a fluidic chamber 301 inside which the piston 600 is movable in translation along the translation axis X.

Through the mobility thereof in the fluidic chamber 301, the piston enables the pumping and ejection of fluid from a fluidic reserve to a tank to be filled.

More specifically, and conventionally, when the piston moves in a first direction along the translation axis X, so as to increase the volume in the fluidic chamber 301, a negative pressure is created inside the fluidic chamber 301 to enable the entry of fluid into the fluidic chamber 301 via the supply coupling 203 and more specifically via the intake manifold 2031.

Conversely, when the piston 600 moves in a second direction opposite the first direction, the volume of the fluidic chamber 301 is reduced as the piston 600 moves in the fluidic chamber 301, which induces the compression of the fluid contained in the fluidic chamber 301 and therefore the discharge thereof from the pump body 300 via the discharge coupling 204, towards the tank to be filled.

For the pumping of a cryogenic type fluid, the parts of the pump 1 are subject to extreme temperatures particularly cold temperatures which can cause the retraction thereof.

To limit this, and particularly limit the retraction of the parts which are not in direct contact with the fluid to be pumped, thermal insulation means 500 are used in the pump 1.

Moreover, using the thermal insulation means 500 makes it possible to limit the cost of the pump 1 according to the invention as conventional pump materials can be used without risk for the structural integrity of the pump.

Temperature transmission can be performed, according to a first means, by thermal conduction. In other words, the parts which are in contact with one another transmit the temperature to one another.

Consequently, with a cold part in contact with another hotter part, a thermal transfer occurs such that the cold part is heated and the hotter part is cooled.

Another temperature exchange means is thermal radiation.

In this case, the temperature exchange between the first part and the second part is performed without contact simply from the fact that the hot temperature of the first part induces a temperature radiation around said first part, which induces the heating of the second part.

Calorie transmission can cause leaks in the pump 1 by the thermal contraction or thermal expansion of the parts thereof. These leaks can be hazardous for the operation of the pump 1 per se or for the environment external to the pump 1 since, in the case of pumping of a cryogenic fluid, the expansion of this fluid can induce the immediate combustion thereof, which can, in the worst case, induce the explosion of the pump 1.

To limit the calorific transmission by conduction and/or the retraction of the parts in direct contact with the cryogenic fluid to be pumped, weakly conductive or non-conductive materials can be used.

By way of example, the head 602 of the piston 600 can be made of invar and the rod 601 of the piston 600 can be made of a composite material for example a composite material based on epoxy resin and fibreglass.

Figure 11:
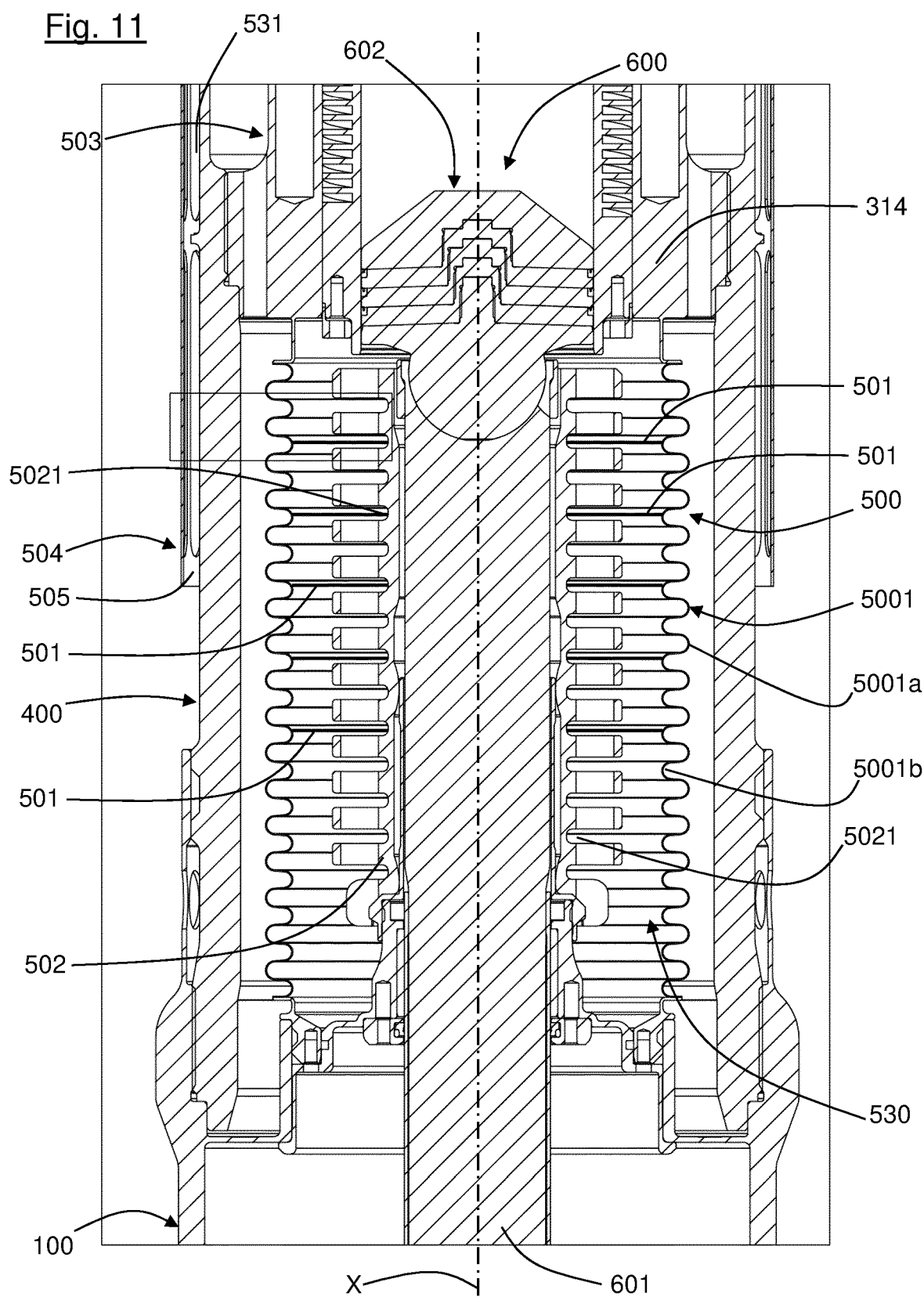
FIG. 11 is a longitudinal sectional detailed view of the pump according to the invention, illustrating thermal insulation means between the motor means or the motor compartment and pumping compartment.

As illustrated in FIG. 11 in particular, the intermediate compartment 400 is presented in the form of a tubular spacer connecting the pumping compartment 200 and the motor compartment 100.

The thermal insulation means 500 comprise a tubular element 5001 housed in the intermediate compartment 400 and extending about the rod 601 of the piston 600, along the translation axis X.

The tubular element 5001 extends between the pumping compartment 200 and the motor compartment 100.

As seen in FIG. 11, the tubular element 5001 defines with the spacer a space 530 to limit the radial radiation of the rod 601 of the piston 600 outwards from the pump 1.

As seen in FIG. 11, the tubular element 5001 has, about the translation axis X, a revolution profile comprising an alternation of peaks 5001a and hollows 5001b with respect to the translation axis X.

In other words, the tubular element has a wall having corrugations.

In other words, the tubular element 5001 forms an elastically deformable gusset to be able to keep a space 530 closed around the rod 601 of the piston 600 between the motor compartment 100 and the pumping compartment 200 independently of the relative spacing between the motor compartment 100 and the pumping compartment 200. Such a relative spacing can be due to the temperature differences during the operation of the pump 1.

The thermal insulation elements or means 500 also comprise at least one disk of insulating material 501.

The disk of insulating material 501 is positioned inside the tubular element 5001 and extends transversally to the translation axis X.

Figure 12:
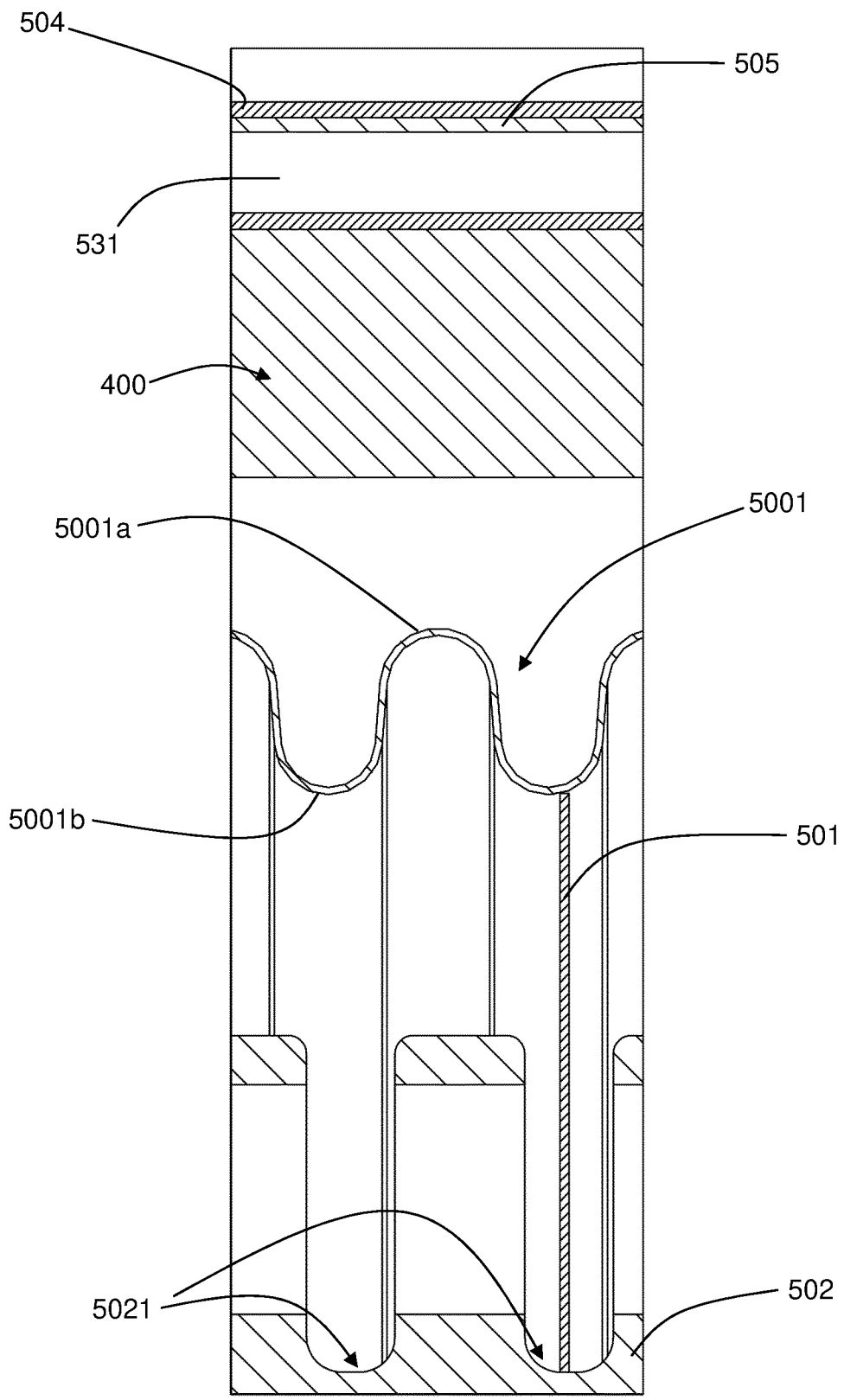
FIG. 12 is a longitudinal sectional detailed view according to Insert 4 of FIG. 3.

More specifically, as seen in FIG. 11, and in the detailed drawing of FIG. 12, the disk of insulating material 501 extends from the rod 601 of the piston 600 to the tubular element 5001.

To help hold the disks of insulating material 501 in position in the pump 1, the pump 1 also comprises a tubular support part 502 having a series of annular grooves 5021.

The tubular support part 502 is integral with the motor compartment 100 and surrounds the rod 601 of the piston 600.

The series of annular grooves 5021 thus extends transversally to the translation axis X.

As seen in FIGS. 11 and 12, the or each disk of insulating material 501 is mounted in one of the grooves 5021 of the tubular support part 502.

Preferably, and as illustrated in FIG. 11, the pump 1 comprises a plurality of disks of insulating material 501.

Even more specifically, the pump 1 comprises 5 disks of insulating material 501.

Each disk is received in an annular groove 5021 of the tubular support part 502.

Thus, each of the disks of insulating material 501 extends radially to the rod 601 of the piston 600. The term radially denotes a transversal direction to the translation axis X.

With reference to FIG. 12, each disk of insulating material 501 extends from the bottom of a groove 5021 to a hollow 5001b of the tubular element 5001.

This makes it possible to limit the radial extension of the disks of insulating material 501, and confine the temperatures to limit the radiation axially to the translation axis X.

As illustrated in FIG. 1, the thermal insulation means 500 further comprise a first layer of insulating material 503.

This first layer of insulating material 503 is positioned around the pump body 300 and forms a sleeve around the pump body 300.

This first layer 503 of insulating material makes it possible to prevent the radiation of the pump body 300 outwards from the pump 1.

According to the detailed view of FIG. 12, the thermal insulation means 500 further comprise a second layer of insulating material 504.

This second layer of insulating material 504 is positioned around the tubular element 5001 straddling the tubular element 5001 and the pump body 300.

More specifically, this second layer of insulating material 504 is located in the casing 201 and extends axially along the translation axis X around the pump body 300 and a part of the intermediate compartment 400.

Between the first layer of insulating material 503 and the second layer of insulating material 504, a peripheral space 531 is created.

More specifically, the second layer 504 of insulating material is borne by a tubular support 505 extending around the pump body and a part of the intermediate compartment 400.

The tubular support 505 is separated radially from the pump body 300 and the intermediate compartment 400 to define the peripheral space 531 with them.

The spaces 530, 531 mentioned make it possible to create insulation via the void between the different parts.

Preferably, the insulating material used for the first layer 503, the second layer 504 and the disks of insulating material 501 is an aluminised polyethylene terephthalate (aluminised PET).

Advantageously, at least one of the tubular element 5001, the intermediate compartment 400 and the rod 601 and the piston 600 is made of a composite material. The composite material is advantageously a material comprising a reinforcement made of fibreglass embedded in an epoxy resin.

The insulation obtained by the thermal insulation means 500 makes it possible to be able to increase the duration of the pumping cycles of the pump 1 since the different parts are subject to little or no impact by the temperature of the cryogenic fluid which is pumped.

Indeed, only the parts intended to be in contact with the cryogenic fluid can be made of materials subject to little impact by negative temperatures, the rest of the elements of the pump being capable of being made of a conventional material such as aluminium or steel or a composite material.

Finally, the thermal insulation means 500 make it possible to limit the harmful effects due to thermal radiation of the parts which can cause frost on the surface of the pump 1 and induce mechanical ruptures in certain parts sensitive to temperature changes.

FIG. 1 illustrates a pump 1 comprising a motor compartment 100 and at least one pumping compartment 200.

More specifically, as illustrated in FIG. 1, the pump 1 advantageously comprises two pumping compartments 200.

The two pumping compartments 200 are each located on either side of the motor compartment 100.

With reference to FIG. 2, the motor compartment 100 incorporates motor means 101 engaged with a transmission shaft 110 in turn connected to the pumping compartment 200.

Hereinafter in the description, reference is only made to a single pumping compartment 200, it being understood that the two pumping compartments 200 are identical and have the same structural and functional characteristics.

As illustrated in FIG. 2, the pumping compartment 200 comprises a pump body 300 inside which a piston 600 is movably mounted in translation along a translation axis X. The piston conventionally comprises a rod 601 and a head 602.

The translation axis X defines a longitudinal direction to the pump 1.

To enable pumping of a fluid, the pumping compartment 200 also comprises:
  a supply coupling 203 opening into an intake manifold 2031 mounted about the pump body 300, and
  a discharge coupling 204.

More specifically, the intake manifold 2031 is presented in the form of an annular conduit surrounding the pump body 300, this annular conduit having a plurality of orifices for supplying the pump body 300 fluidically.

Furthermore, the pump 1 comprises an intermediate compartment 400 inserted between the motor compartment 100 and each pumping compartment 200 as well as insulation means 500.

In the aim of protecting the pumping compartment 200, the pump 1 comprises a casing 201 closed at one of the ends thereof by a cap 202a.

At the other of the ends thereof, the casing 201 extends in the direction of the motor compartment 100 and is closed by a cover 202b making it possible to define an internal volume of the casing 201 wherein the pump body 300 is housed and protected.

Preferably, a vacuum is created in the internal volume of the casing 201.

As seen in FIGS. 1 and 2, the supply coupling 203 and the discharge coupling 204 each open into the casing 201 to enable respectively the fluidic supply and extraction of fluid into and from the pump body 300.

The joint between the transmission shaft 110 and the piston 600 is embodied by ad hoc mechanical coupling means, these mechanical coupling means optionally being reversible, i.e. they make it possible to separate the transmission shaft 110 from the piston 600.

Advantageously, the motor means 101 comprise a ball screw or, more advantageously, a roller screw.

The ball screw or the roller screw makes it possible to convert a rotation movement of the motor means 101 into a translation movement of the transmission shaft 110 and therefore of the piston 600 in the pump body 300.

Advantageously, the motor means 101 comprise a direct current motor.

The pump body 300 defines a fluidic chamber 301 inside which the piston 600 is movable in translation along the translation axis X.

Through the mobility thereof in the fluidic chamber 301, the piston enables the pumping and ejection of fluid from a fluidic reserve to a tank to be filled.

More specifically, and conventionally, when the piston moves in a first direction along the translation axis X, so as to increase the volume in the fluidic chamber 301, a negative pressure is created inside the fluidic chamber 301 to enable the entry of fluid into the fluidic chamber 301 via the supply coupling 203 and more specifically via the intake manifold 2031.

Conversely, when the piston 600 moves in a second direction opposite the first direction, the volume of the fluidic chamber 301 is reduced as the piston 600 moves in the fluidic chamber 301, which induces the compression of the fluid contained in the fluidic chamber 301 and therefore the discharge thereof from the pump body 300 via the discharge coupling 204, towards the tank to be filled.

The movement and the speed of movement of the piston 600 in the pump body 300 can be modulated to enable optimal filling of the tank to be filled according to the time available for filling the tank to be filled, but also according to the type of fluid to be pumped and particularly the intrinsic characteristics thereof.

Indeed, some fluids cannot be compressed or are virtually not compressed, whereas others can be substantially compressed, and some fluids have characteristics such as in the case of overly rough handling, for example overly rapid compression or expansion, these fluids can ignite, or create an explosion which can damage the pump 1.

It is therefore necessary to be able to modulate the movement speed of the piston 600 in the pump body 300.

Pumping a cryogenic type fluid can for example induce the retraction of the parts which are in contact with the fluids.

This is particularly the case of the pump body 301 or even and more frequently the piston 600, particularly the head 602 thereof.

A retraction of the elements, particularly of the rod 601 and the head 602 of the piston 600 can induce a decrease in efficiency of the pump 1.

In the case of a cryogenic fluid having an expansion capable of inducing the immediate combustion thereof, it is necessary to retain a constant, or virtually constant, stroke of the piston 600 to prevent any expansion of the cryogenic fluid which could then induce an explosion of the pump 1 in the worst case.

Figure 13:
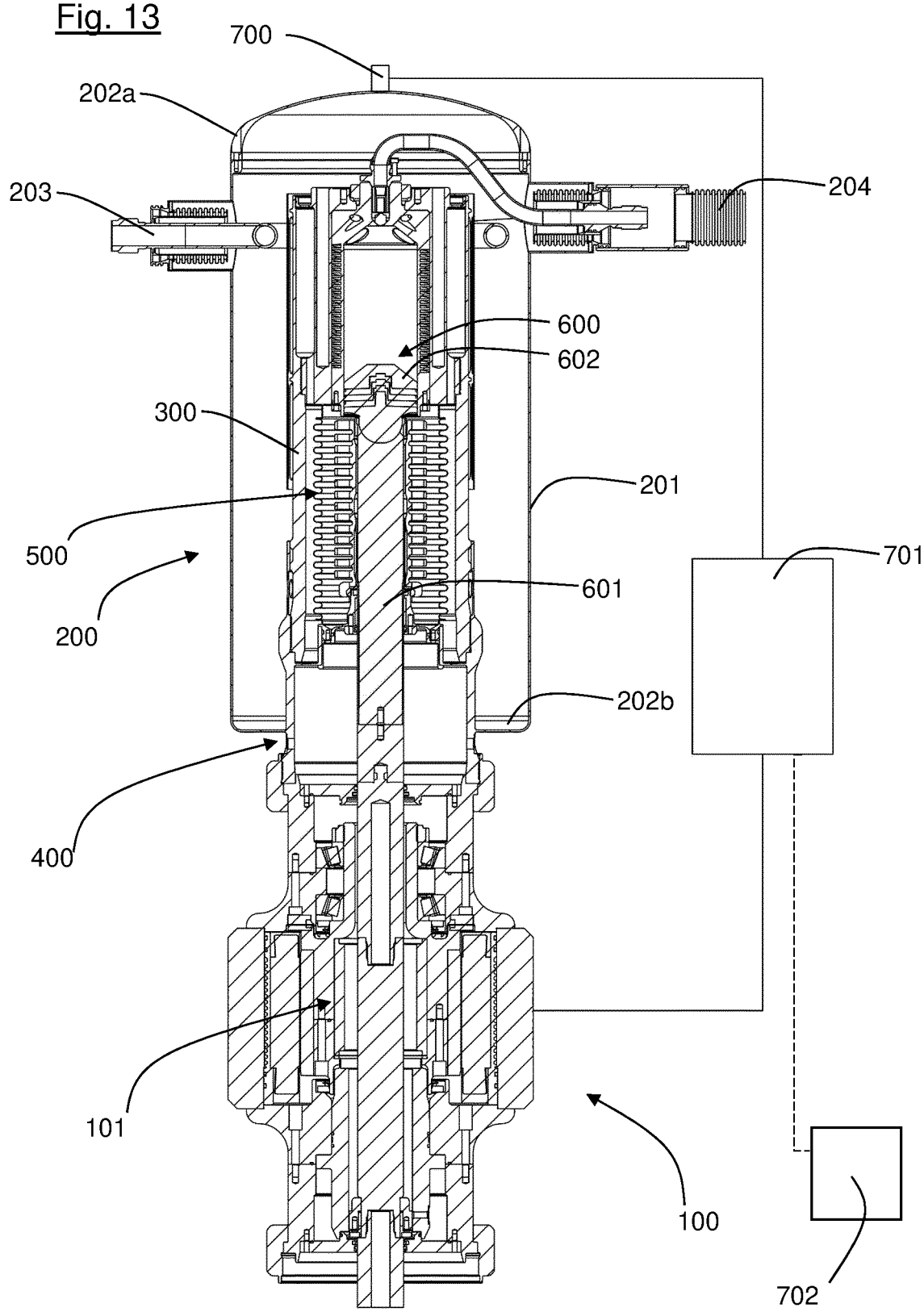
FIG. 13 is a schematic view of a pump according to the invention comprising means for setting the stroke of the piston.

For this, the pump 1 according to the invention is equipped with means for setting the stroke of the piston 600, as illustrated in FIG. 13.

The means for setting the stroke of the piston 600 comprise:
an end-of-stroke sensor 700 of the piston 600;
a computer 701 connected to the end-of-stroke sensor 700 and to the motor means 101.

The computer 701 is advantageously configured to generate and transmit an operating set-point to the motor means 101 using an output signal of the end-of-stroke sensor 700 and thus adjust the stroke of the piston 600 in the pump body 300 along a predefined nominal stroke.

Indeed, when the piston 600 retracts, the stroke thereof in the pump body 300 is reduced.

By way of example, when the retraction of the piston 60 is one millimetre, the movement stroke of the piston in the pump body 300 is reduced equally, i.e. by one millimetre.

This then results in a lack of compression of the fluid in the pump 1 and therefore a decrease in efficiency of the pump 1, the entirety of the pumped fluid then not being discharged during the discharge phase.

It is therefore necessary to be able to extend the stroke of the piston 600, or on the other hand reduce it, in order to retain a stroke of the piston 600 substantially equal to the predefined nominal stroke and for which the efficiency of the pump 1 is maximum.

For this, the end-of-stroke sensor 700 is an accelerometer type sensor.

The end-of-stroke sensor 700 is positioned outside the pump body 300. Preferably, the end-of-stroke sensor 700 is positioned in the translation axis X of the piston 600 in the pump body 300.

Such a positioning of the end-of-stroke sensor 700 makes it possible to prevent an intrusion of said end-of-stroke sensor 700 in the pump body 300, which does not reduce the volume allocated to the fluid in the pump body 300.

Moreover, this makes it possible to favour maintenance of the end-of-stroke sensor 700 where necessary.

When the end-of-stroke sensor 700 detects the end of stroke of the piston 600 in the pump body 300, it transmits an output signal to the computer 701 which then generates an operating set-point to be transmitted to the motor means 101.

This operating set-point lies in an extension or a shortening of the stroke of the piston 600 in the pump body 300.

The extension or shortening of the stroke of the piston 600 is carried out by setting the motor means 101 and particularly by setting the action of the roller screw on the rod 601 of the piston 600.

More specifically, the rod 601 of the piston 600 has an external thread linked with the motor means 101, the rod 601 of the piston 600 forming with the motor means 101 a ball screw or roller screw type joint.

The stroke of the piston 600 is the pump body 300 is set as follows.

The end-of-stroke sensor 700 of the piston 600 detects the abutment of the piston 600 and particularly of the head 602 of the piston 600 against the pump body 300.

This abutment corresponds to the top dead centre of the piston 600, i.e. to the minimum volume allocated to the fluid in the pump body 300.

When the end-of-stroke sensor 700 detects the top dead centre thereof, particularly by a vibration due to the abutment of the piston 600 against the pump body 300, it emits an output signal which is received by the computer 701.

The computer 701 then generates an operating set-point intended for the motor means 101 aimed at extending or on the other hand shortening the stroke of the piston 600 in the pump body 300.

In operation, the stroke of the piston 600 is normally increased. By normally increased, it is understood that the stroke of the piston 600 is increased continuously so that the end-of-stroke sensor 700 has a non-zero output signal value.

When the output signal value of the end-of-stroke sensor 700 is zero, this means that the piston 600 does not move along the nominal stroke thereof and that a modification of the operating set-point must be performed.

This thus makes it possible to obtain a new non-zero output signal value of the end-of-stroke sensor, which means that there is no dead volume in the pump body 300 during the ejection phase.

Moreover, the computer 701 is also configured to perform monitoring of the operation of the pump 1.

By way of example, the computer can transmit, to a control device 702 external to the pump 1, all the operating set-points generated and transmitted to the motor means 101 as well as all the output values of the end-of-stroke sensor 700.

The control device 702 is for its part configured to compare the frequency of the change of operating set-points transmitted to the motor means 101 and/or the values of the output signal of the end-of-stroke sensor 700.

In the case of overly frequent zero values of the output signal of the end-of-stroke sensor 700, and/or overly recurrent set-point changes, the control device 702 can emit a malfunction alert in respect of the pump 1 to an operator.

The transmission between the computer 701 and the control device 702 can advantageously be carried out wirelessly. A wired link between the computer 701 and the control device 702 can be an alternative embodiment.

It is thus possible to monitor the operation of the pump 1 and control the correct efficiency of the pump 1 or then provide, where applicable, a maintenance procedure in respect of the pump 1, particularly in the event of malfunction, or operating set-points transmitted to the motor means 101 too frequently.

The efficiency of the pump 1 is thus improved, as is the service life thereof since maintenance phases can be set up by monitoring the operation of the pump 1.

FIG. 1 illustrates a pump 1 comprising a motor compartment 100 and at least one pumping compartment 200.

More specifically, as illustrated in FIG. 1, the pump 1 advantageously comprises two pumping compartments 200.

The two pumping compartments 200 are each located on either side of the motor compartment 100.

With reference to FIG. 2, the motor compartment 100 incorporates motor means 101 engaged with a transmission shaft 110 in turn connected to the pumping compartment 200.

Hereinafter in the description, reference is only made to a single pumping compartment 200, it being understood that the two pumping compartments 200 are identical and have the same structural and functional characteristics.

As illustrated in FIG. 2, the pumping compartment 200 comprises a pump body 300 inside which a piston 600 is movably mounted in translation along a translation axis X.

The translation axis X defines a longitudinal direction to the pump 1.

To enable pumping of a fluid, the pumping compartment 200 also comprises:

a supply coupling 203 opening into an intake manifold 2031 mounted about the pump body 300, and a discharge coupling 204.

More specifically, the intake manifold 2031 is presented in the form of an annular conduit surrounding the pump body 300, this annular conduit having a plurality of orifices for supplying the pump body 300 fluidically.

Furthermore, the pump 1 comprises an intermediate compartment 400 inserted between the motor compartment 100 and each pumping compartment 200 as well as insulation means 500.

In the aim of protecting the pumping compartment 200, the pump 1 comprises a casing 201 closed at one of the ends thereof by a cap 202*a*.

At the other of the ends thereof, the casing 201 extends in the direction of the motor compartment 100 and is closed by a cover 202*b* making it possible to define an internal volume of the casing 201 wherein the pump body 300 is housed and protected.

Preferably, a vacuum is created in the internal volume of the casing 201.

As seen in FIGS. 1 and 2, the supply coupling 203 and the discharge coupling 204 each open into the casing 201 to enable respectively the fluidic supply and extraction of fluid into and from the pump body 300.

The joint between the transmission shaft 110 and the piston 600 is embodied by ad hoc mechanical coupling means, these mechanical coupling means optionally being reversible, i.e. they make it possible to separate the transmission shaft 110 from the piston 600.

Advantageously, the motor means 101 comprise a ball screw or, more advantageously, a roller screw.

The ball screw or the roller screw makes it possible to convert a rotation movement of the motor means 101 into a translation movement of the transmission shaft 110 and therefore of the piston 600 in the pump body 300.

Advantageously, the motor means 101 comprise a direct current motor.

The pump body 300 defines a fluidic chamber 301 inside which the piston 600 is movable in translation along the translation axis X.

Through the mobility thereof in the fluidic chamber 301, the piston enables the pumping and ejection of fluid from a fluidic reserve to a tank to be filled.

More specifically, and conventionally, when the piston moves in a first direction along the translation axis X, so as to increase the volume in the fluidic chamber 301, a negative pressure is created inside the fluidic chamber 301 to enable the entry of fluid into the fluidic chamber 301 via the supply coupling 203 and more specifically via the intake manifold 2031.

Conversely, when the piston 600 moves in a second direction opposite the first direction, the volume of the fluidic chamber 301 is reduced as the piston 600 moves in the fluidic chamber 301, which induces the compression of the fluid contained in the fluidic chamber 301 and therefore the discharge thereof from the pump body 300 via the discharge coupling 204, towards the tank to be filled.

Figure 14:
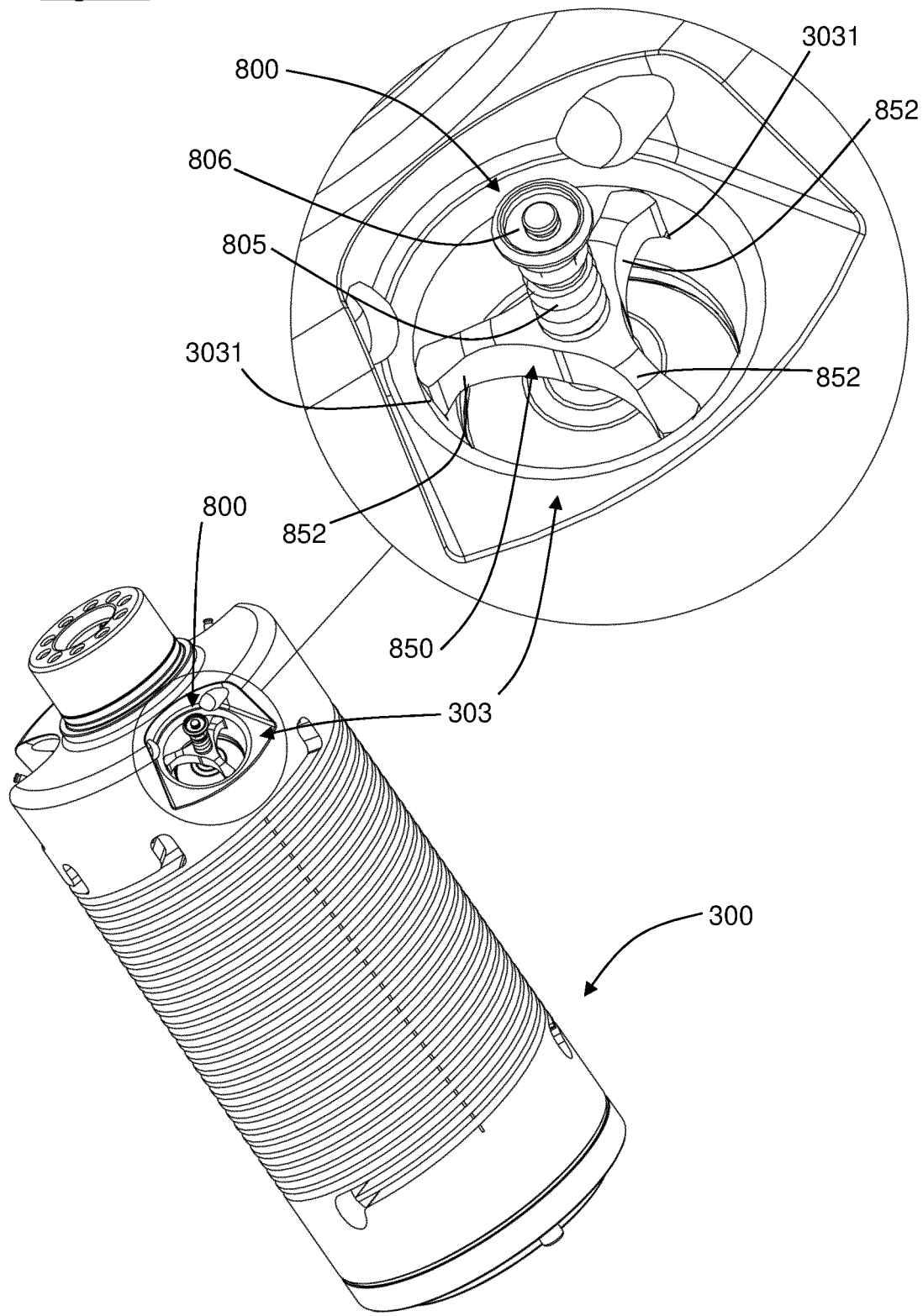
FIG. 14 is a perspective top view of a pump body of the pump according to the invention, this figure having a detailed inset on an enlarged scale illustrating an intake manifold of the pump body inside which an intake valve is mounted.

With reference to FIG. 14, the pump body 300 has at least one fluid intake manifold 303 opening inside the fluidic chamber 301.

More specifically, the pump body 300 has three intake manifolds 303 regularly distributed at the periphery of the pump body 300.

To enable effective fluid pumping, i.e. a succession of intake phases and ejection phases, each intake manifold 303 is provided with a valve 800 for sealing the intake manifold 303 or not in order to allow or prevent the passage of fluid from outside the pump body 300 to the fluidic chamber 301 or vice versa from the fluidic chamber 301 outwards from the pump body 300.

More specifically, each intake manifold 303 has at an end opening into the pump body 300, a valve seat 315.

The valve seat 315 has a semi-elliptical profile of revolution about a central axis C of the valve seat 315.

Figure 15:
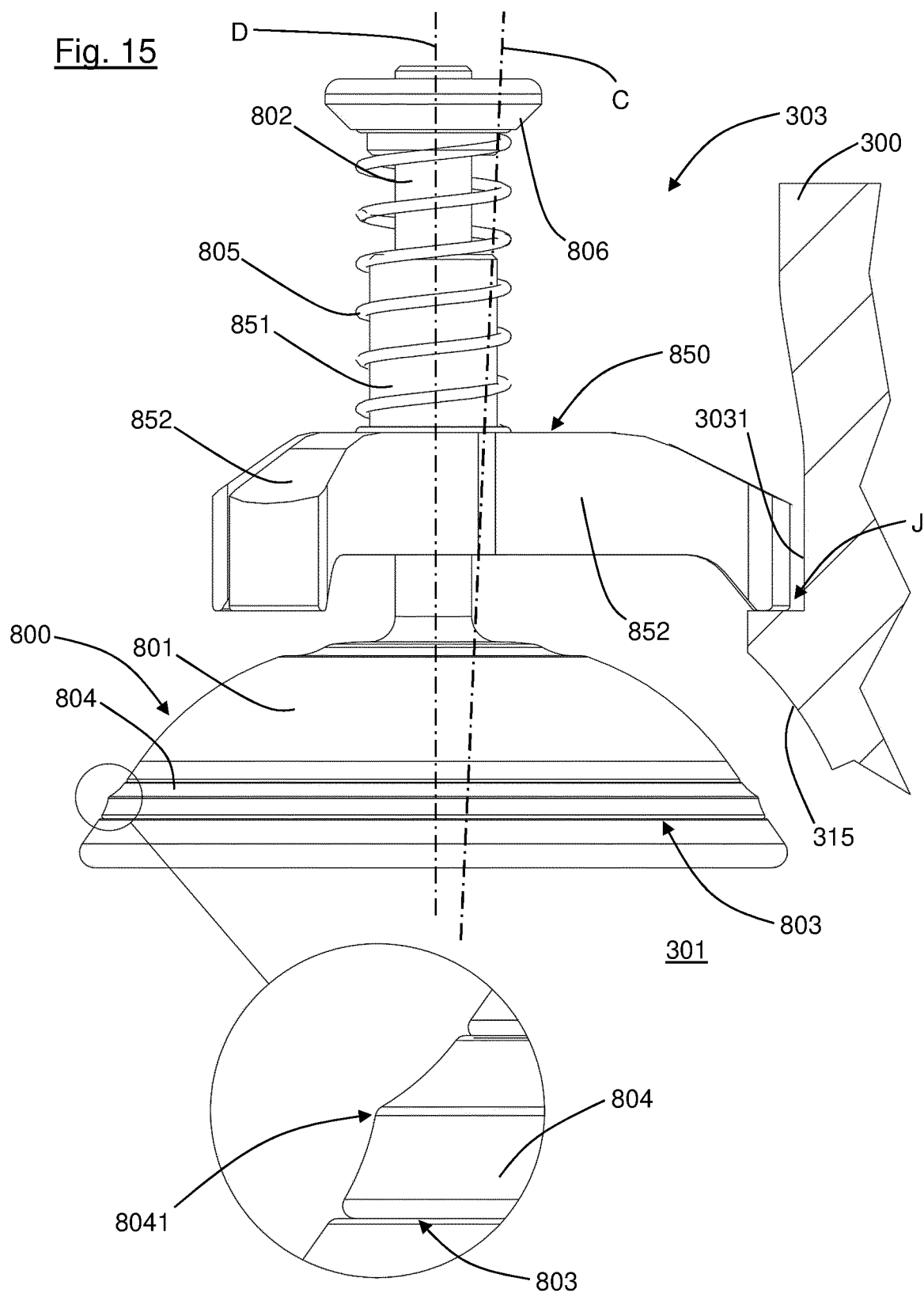
FIG. 15 is a longitudinal sectional view of an intake valve of the pump according to the invention.
Figure 16:
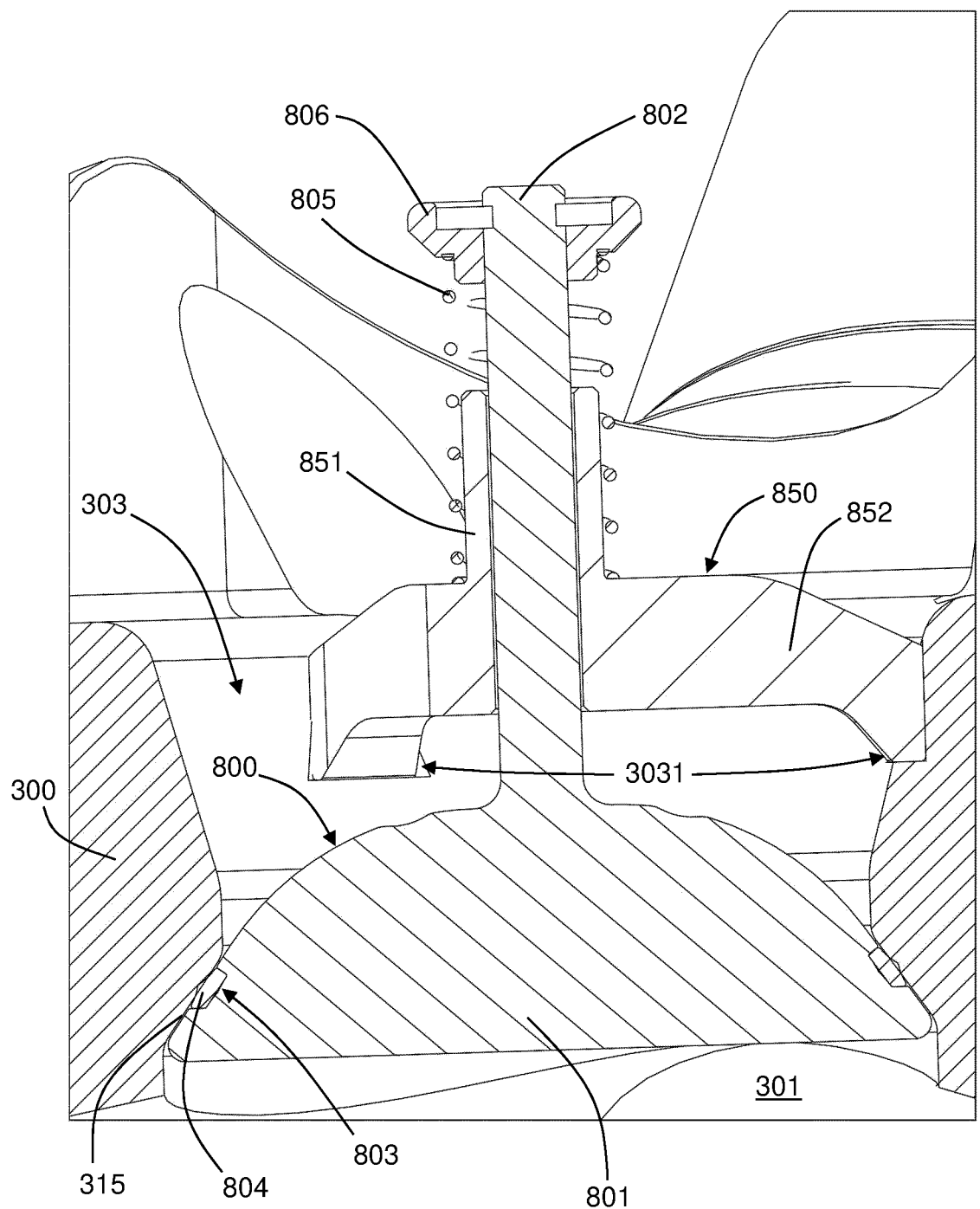
FIG. 16 is a front view of an intake valve of the pump according to the invention, this figure having a detailed inset on an enlarged scale illustrating a peripheral seal mounted on the intake valve.

With reference to FIGS. 15 and 16, each valve 800 has a valve head 801 and a rod 802 extending from the head 801, the rod 802 defining a movement axis D of the valve 800 with respect to the valve seat 315.

Thus, each valve 800 is movable in translation along the movement axis D, between:
- a passage position wherein it is spaced apart from the valve seat 315;
- a sealing position wherein it seals the valve seat 315.

The pump 1 also comprises, for each valve 800, a guide 850 whereby the valve 800 is guided in movement.

The guide 850 takes its place in the intake manifold 303 as explained hereinafter.

With reference to FIG. 15 and to FIG. 16, the guide 850 has a central shaft 851 from which at least two arms 852 extend.

More specifically, as seen in FIG. 14, the guide 850 has three arms 852 regularly spaced apart from one another. In other words, two adjacent arms 852 are spaced apart angularly from one another by an angle of 120°.

The pump 1 also comprises, for each valve 800, return means 805 of the valve 800 to the sealing position thereof.

The return means 805 are inserted between the valve 800 and the guide 850.

More specifically, the return means 805 comprise a compression spring mounted around the central shaft 851 of the guide 850, the spring being inserted between the arms 852 of the guide 850 and a stop 806 integral with the rod 802 at an end opposite the head 801.

Advantageously, the stop 806 is mounted removably on the rod 802, which makes it possible to be able to change the compression spring if needed.

As illustrated in the detailed inset of FIG. 14, in FIG. 15 and in FIG. 16, for each valve 800, the pump body 300 has, in each intake manifold 303, upstream from the valve seat 315, along a direction of fluid flow from outside to inside the pump body 300, at least one notch 3031.

More specifically, as seen in the detailed inset of FIG. 14, each intake manifold 303 has three notches 3031 in each whereof an arm 852 of the guide 850 is housed.

As seen in FIG. 16, the guide 850 is mounted in the or each notch 3031 with a functional gap J.

This functional gap J allows a switch of the movement axis D from an offset position with respect to the central axis C in the passage position of the valve 800, to a position merged with the central axis C in the sealing position of the valve 800.

This enables the valve 800 to move freely to favour fluid entry into the chamber 301 of the pump body 300 and be able to ensure good tightness when the pumping process is in a discharge phase and the pressure prevailing in the chamber 301 causes the valve 800 head 801 to come against the valve seat 315.

Good tightness ensured by the valve 800 is carried out when the movement axis D of the valve 800 is merged with the central axis C of the valve seat 315.

As seen in FIGS. 15 and 16, the valve 800 head 801 has a portion with a semi-elliptical profile 801a, oriented towards the rod 802, and complementary in shape with the valve seat 315.

To improve the tightness further between the valve 800 with the valve seat 315, each valve 800 has an annular groove 803 inside which an annular seal 804 is housed.

More specifically, the annular groove 803 is formed on the head 801 of the valve 800, and the annular seal 804 is mounted inside the annular groove 803.

The annular groove 803 is advantageously formed on the portion with a semi-elliptical profile of the valve 803 head 801.

Thus, in the sealing position of the valve 800, the annular seal 804 is inserted between the valve head 801 and the valve seat 315.

With reference to the detailed inset of FIG. 15, the annular seal 804 has a convex part 8041. The convex part 8041 is intended to bear against the valve seat 315 in the sealing position of the valve.

Thus, when the valve 800 is in the sealing position thereof, the convex part 8041 of the annular seal 804 is elastically deformed to mould the valve seat 315 and create hermetic sealing of the valve seat 315.

In operation, when the pumping process is in an intake phase, the fluid to be pumped enters the intake manifold 303 and exerts a pressure on the head 801 of the valve 800. The pressure pushes the valve 800 back towards to the fluidic chamber 301 of the pump body 300.

This then induces a compression of the return means 805 between the stop 806 of the valve 800 and the arms 852 of the guide 850.

When the process enters the fluid ejection phase thereof, the pressure in the fluidic chamber 301 increases.

The fluid contained in the fluidic chamber 301 then exerts a force on the head 801 of the piston 800 to move the head up towards the intake manifold 303, particularly using return means 805.

When the valve 800 moves up towards the intake manifold 303, the guide 850 can then move freely in the notches 3031, and can move in the intake manifold 303, thanks to the functional gap J (represented in FIG. 15).

More specifically, the arms 852 move in the notches 3031 in order to enable the repositioning of the movement axis D so that the valve 800 is positioned optimally against the valve seat 315.

The pressure exerted by the fluid contained in the fluidic chamber 301 is then uniform on the head of the piston 301, which then induces the switch of the movement axis D from an offset position with respect to the central axis C to a position merged with the central axis C when the valve 800 is in the sealing position thereof.

The force exerted by the return means 805 between the stop 806 and the guide 850 then induces the abutment in the notches 3031 of the arms 852 of the guide 850.

The valve 800 can only be mounted in the pump body 300 via outside the pump body 300.

For this, the head 801 of the valve 800 is inserted via the intake manifold 303 then the rod 802 of the valve 800 is pivoted such that the movement axis D of the valve 800 is aligned or virtually aligned with the central axis C of the valve seat 315.

The guide 850 is then positioned such that the arms thereof can be facing the notches 3031, which makes it possible, when the valve 800 is released, for the head to be housed in the valve seat 315, so as to form a hermetic joint between the head 801 of the valve 800 and the valve seat 315. When the joint is hermetic between the valve 800 and the valve seat 315, this corresponds to a colinear positioning of the movement axis D with the central axis C.

As illustrated in FIG. 2, the pump 1 comprises a liner 314 having a bottom wall 3141. The pump body 300 is force-fitted in the liner 314, i.e. with no gap between the liner 314 and the pump body 300.

The bottom wall 3141 of the liner 314 then plugs an opening of the intake manifold 303 opening outside the pump body 300, which makes it possible to form a fluid reserve in the intake manifold 3030 of the pump body 300.

The fluid reserve is then filled when the fluid to be pumped reaches the intake manifold 303 and the valve 800 is in the sealing position thereof.

The valve 800 described above makes it possible to be able to adopt the passage position thereof and the sealing position thereof automatically simply by the pressure or negative pressure prevailing in the fluidic chamber 301.

Moreover, the valve 800 ensures good tightness in the sealing position thereof by the presence of the functional gap J which enables the valve 800 to be offset freely to ensure an undisturbed fluid passage and cover a totally hermetic sealing position.

The hermetic sealing of the intake manifold 300 by the valve 800 is, furthermore, supplemented by the presence of the annular seal 804 wherein the convex part 8041 is elastically deformed to mould the shape of the valve seat 315.

Advantageously, the annular seal 804 is made of a material of the polyimide family which enables it to retain the structural and functional characteristics in use under extreme, hot or cold temperatures.

An exemplary embodiment of the present disclosure remedies one or more of the drawbacks of the prior art.

More specifically, an exemplary embodiment provides a solution for limiting the temperature gradients of the parts of the pump and protect the structural integrity thereof.

An exemplary embodiment provides such a solution which is not energy-intensive.

An exemplary embodiment provides such a solution which automatically regulates the cooling temperature of the parts of the pump according to the fluid to be pumped.

An exemplary embodiment provides a solution enabling safe pumping of the cryogenic fluids.

An exemplary embodiment provides a such a solution making it possible to compensate the differential expansion of the different components of a piston head.

An exemplary embodiment provides such a solution which is simple to manufacture.

An exemplary embodiment provides a solution making it possible to limit, or suppress, cooling of the parts of a cryogenic fluid pump, which are not in contact with the fluid to be pumped and/or limit heating of the parts of the pump, which are in contact with the fluid to be pumped.

An exemplary embodiment provides such a solution which makes it possible to retain a reduced size of the pump.

An exemplary embodiment provides such a solution of simple manufacture, installation and maintenance.

An exemplary embodiment provides a pump wherein the stroke of the piston can be modified according to characteristics of the fluid to be pumped.

An exemplary embodiment provides such a pump wherein the modification of the piston stroke is automatic.

An exemplary embodiment provides such a pump wherein the piston stroke can be set with precision without shutting down the pump.

An exemplary embodiment provides a pump for pumping a cryogenic fluid without leaks, or virtually.

An exemplary embodiment provides such a pump wherein the operation of the valves is automatic.

Although the present disclosure has been described with reference to one or more examples, workers skilled in the art will recognize that changes may be made in form and detail without departing from the scope of the disclosure and/or the appended claims.

The invention claimed is:

1. A pump comprising:
a pump body and a piston, wherein the piston comprises:
at least two disks stacked on one another, each disk having a top face and a bottom face opposite the top face;
a continuous annular seal housed between the at least two disks,
wherein each disk has, at a centre thereof, a hole opening onto the bottom face and wherein at least one of the disks has, at a centre thereof, a projection extending from the top face and engaging with the hole of the other of the disks such that the continuous annular seal is clamped between the disks, and wherein each hole has an internal thread and each projection has an external thread, the external thread of the projection engaging helicoidally with the internal thread of the hole of the other of the disks,
the piston being slidably mounted in the pump body such that the continuous annular seal is in contact with an inner wall of the pump body.

2. The pump according to claim 1, wherein the piston comprises at least a third disk having:
a top face from which a projection extends;
a bottom face whereon a hole opens, the third disk being assembled with the at least two other disks by engagement of the projection thereof with a free hole of the at least two other disks,
and the piston also comprises a second continuous annular seal inserted between the top face of the third disk and the bottom face of one of the at least two other disks with which the second continuous annular seal is assembled.

3. The pump according to claim 1, wherein at least one of the at least two disks has, on the top face thereof, a shoulder wherein the continuous annular seal is received.

4. The pump according to claim 1, wherein the piston comprises a connection part to a piston rod, the connection part having, at a center thereof, a pin cooperating with a free hole of one of the disks.

5. The pump according to claim 4, wherein the connection part has a connection portion opposite the pin, the connection portion having a spherical shape to be received in a spherical cavity of the piston rod.

6. The pump according to claim 1, wherein the continuous annular seal has a U-shaped longitudinal cross-section, the U opening along a direction parallel with an axis of revolution of the continuous annular seal.

7. The pump according to claim 1, wherein each disk of made of invar.

8. The pump according to claim 1, wherein the continuous annular seal is made of a material of a polyimide family.

* * * * *